US009129161B2

(12) United States Patent
Agosta et al.

(10) Patent No.: US 9,129,161 B2
(45) Date of Patent: Sep. 8, 2015

(54) COMPUTATIONALLY EFFICIENT SCENE CLASSIFICATION

(71) Applicant: TOYOTA JIDOSHA KABUSHI KAISHA, Toyota-shi, Aichi-ken (JP)

(72) Inventors: John Mark Agosta, Palo Alto, CA (US); Preeti Pillai, Sunnyvale, CA (US); Kentaro Oguchi, Menlo Park, CA (US); Ganesh Yalla, Mountain View, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/171,677

(22) Filed: Feb. 3, 2014

(65) Prior Publication Data
US 2014/0355879 A1   Dec. 4, 2014

Related U.S. Application Data

(60) Provisional application No. 61/829,980, filed on May 31, 2013.

(51) Int. Cl.
| | |
|---|---|
| *G06K 9/00* | (2006.01) |
| *G06K 9/46* | (2006.01) |
| *G06T 7/00* | (2006.01) |

(52) U.S. Cl.
CPC ........ *G06K 9/00791* (2013.01); *G06K 9/00664* (2013.01); *G06K 9/468* (2013.01); *G06T 7/0081* (2013.01); *G06T 7/0087* (2013.01); *G06T 2207/30252* (2013.01)

(58) Field of Classification Search
CPC ............................. G06K 9/4604; G06K 9/4642
See application file for complete search history.

(56) References Cited

U.S. PATENT DOCUMENTS

| | | | | |
|---|---|---|---|---|
| 8,260,050 B2* | 9/2012 | Stein et al. | ..................... | 382/173 |
| 2010/0098297 A1* | 4/2010 | Zhang | ........................... | 382/104 |
| 2012/0127309 A1* | 5/2012 | Lee | ............................... | 348/148 |
| 2012/0206597 A1* | 8/2012 | Komoto et al. | ............... | 348/135 |

OTHER PUBLICATIONS

Zhou et al, "Scene classification using a multi-resolution bag-of-features model", Pattern Recognition, 8/12, vol. 46, p. 424-433.*
Agosta, et al., "A Lightweight Inference Method for Image Classification." UAI Application Workshops. 2013.
Agosta, "The structure of Bayes networks for visual recognition." Proceedings of the Fourth Annual Conference on Uncertainty in Artificial Intelligence. North-Holland Publishing Co., 1990, pp. 397-406.

(Continued)

*Primary Examiner* — Edward Park
(74) *Attorney, Agent, or Firm* — Patent Law Works LLP

(57) ABSTRACT

The disclosure describes novel technology for inferring scenes from images. In one example, the technology includes a system that can determine partition regions from one or more factors that are independent of the image data, for an image depicting a scene; receive image data including pixels forming the image; classify pixels of the image into one or more pixel types based on one or more pixel-level features; determine, for each partition region, a set of pixel characteristic data describing a portion of the image included in the partition region based on the one or more pixel types of pixels in the partition region; and classify a scene of the image based on the set of pixel characteristic data of each of the partition regions.

39 Claims, 21 Drawing Sheets
(1 of 21 Drawing Sheet(s) Filed in Color)

(56) References Cited

OTHER PUBLICATIONS

Fei-Fei, et al., "A Bayesian approach to unsupervised one-shot learning of object categories." Computer Vision, 2003. Proceedings. Ninth IEEE International Conference on. IEEE, 2003, pp. 1134-1141 vol. 2.

Hoiem, et al., "Closing the loop in scene interpretation." Computer Vision and Pattern Recognition, 2008. CVPR 2008. IEEE Conference on. IEEE, 2008, pp. 1-8.

Levitt, et al., "Model-based influence diagrams for machine vision," Proceedings of the 5th Conference on Uncertainty in AI (1989), pp. 233-244.

Oliva, et al., "Building the gist of a scene: The role of global image features in recognition." Progress in brain research 155 (2006): 23-36, pp. 1-19.

Oliva, et al., "Modeling the shape of the scene: A holistic representation of the spatial envelope." International journal of computer vision 42.3 (2001): 145-175, pp. 145-175.

Sidenbladh, et al., "Stochastic tracking of 3D human figures using 2D image motion." Computer Vision—ECCV 2000. Springer Berlin Heidelberg, 2000. 702-718, pp. 1-18.

\* cited by examiner

685

700

|  | | Predicted Labels 702 | | |
|---|---|---|---|---|
|  | | Label 1 | Label 2 | Label 3 |
| True Labels 704 | Label 1 | 50 | 2 | 3 |
|  | Label 2 | 4 | 60 | 7 |
|  | Label 3 | 5 | 6 | 70 |

706

708

750

|  | Mountainous | Open rural | Residential | Urban |
|---|---|---|---|---|
| Recall | 1.0 | 0.9 | 0.794 | 0.45 |
| Precision | 0.642 | 1.0 | 0.964 | 1.0 |
| Accuracy |  |  |  | 0.784 |

Table 1: Surroundings

|  | Curves and grades | Limited access highway | Local | No shoulder | Streetside parking |
|---|---|---|---|---|---|
| Recall | 1.0 | 0.75 | 0.0 | 0.85 | 0.56 |
| Precision | 0.61 | 1.0 | NaN | 1.0 | 1.0 |
| Accuracy |  |  |  |  | 0.770 |

Table 2: Roadways

|  | Bicycles and pedestrians | Traffic and congestion | Unimpeded |
|---|---|---|---|
| Recall | 0.56 | 0.6 | 0.98 |
| Precision | 0.875 | 0.93 | 0.67 |
| Accuracy |  |  | 0.754 |

Table 3: Driving Conditions

|  | Clear road | Construction | Merge intersection | Tree trunks and poles |
|---|---|---|---|---|
| Recall | 0.42 | 0.96 | 0.6 | 1.0 |
| Precision | 1.0 | 0.92 | 0.86 | 0.55 |
| Accuracy |  |  |  | 0.738 |

Table 4: Road Obstacles

Figure 7B

COMPUTATIONALLY EFFICIENT SCENE CLASSIFICATION

CROSS-REFERENCE TO RELATED APPLICATIONS

This application claims the benefit under 35 U.S.C. §119(e) of U.S. Provisional Application No. 61/829,980, entitled "Driver Assistance by a Lightweight Scene Classification System", filed on May 31, 2013, the entire contents of which are incorporated herein by reference.

BACKGROUND

The specification relates to image processing. In particular, the specification relates to inferring scenes from images.

Existing solutions for image analysis often rely on computationally expensive methods such as object recognition methods, pixel-level segmentation, or scanning a detection window over an image, etc. During object recognition, these existing approaches often analyze the pixel data in the image to determine how the image should be segmented, which requires significant processing time and can thus introduce latency or lag that can annoy users. As a result, it is generally impractical to use these solutions on mobile computing devices to analyze video streams being captured by those devices in real-time.

Many existing vehicular video systems provide little or no interpretation or analysis on images captured by them, such as images captured by current rear-view cameras. These systems may overlay the road geometry with images to highlight various aspects (e.g., a footprint of a vehicle when parking), but do so without interpreting the scene depicted by the images. Also, some systems may store or share images with other vehicles in compressed or reduced form, but they generally do not provide analysis or interpretation for the images. Other specialized vehicular video systems may identify specific driving-relevant features in the image, such as lane boundaries or crosswalks; they generally do not provide a holistic scene-level analysis to characterize the image.

SUMMARY

According to one innovative aspect of the subject matter described in this disclosure, a system for inferring scenes from images includes a processor and a memory storing instructions that, when executed, cause the system to: determine partition regions for an image depicting a scene; receive image data including pixels forming the image; classify pixels of the image into one or more pixel types based on one or more pixel-level features; determine, for each partition region, a set of pixel characteristic data describing a portion of the image included in the partition region based on the one or more pixel types of pixels in the partition region; and classify a scene of the image based on the set of pixel characteristic data of each of the partition regions.

In general, another innovative aspect of the subject matter described in this disclosure may be embodied in methods that include: determining partition regions for an image depicting a scene; receiving image data including pixels forming the image; determining partition regions for the image; classifying pixels of the image into one or more pixel types based on one or more pixel-level features; determining, for each partition region, a set of pixel characteristic data describing a portion of the image included in the partition region based on the one or more pixel types of pixels in the partition region; and classifying a scene of the image based on the set of pixel characteristic data of each of the partition regions.

Other aspects include corresponding methods, systems, apparatus, and computer program products for these and other innovative aspects.

These and other implementations may each optionally include one or more of the following features, including, for instance, determining an overall impression of content depicted by the image and using the overall impression to categorize the image into one or more scene categories; that at least two or more of the partition regions, when applied to the image, converge at a central point within an area of the image; that the number of partition regions is five or more; that the central point is a reference point that sets expectations that determine aspects used during classification of the scene and a geometry of each of the partition regions is determined based on the central point; that a geometry of the partition regions is determined based on one or more factors that are independent of image data forming the image; that the one or more factors include a motion of a moving platform, and the geometry of each of the partition regions is determined based on the motion of the moving platform; that the central point is predictive of an epipole; that each of the partition regions extends outwardly from the central point to an edge corresponding to an edge of the image; capturing the image data from a moving platform traveling on a roadway; that the image depicts the scene including the roadway; that determining the set of pixel characteristic data for each partition region includes determining a pixel-type distribution within each partition region, and generating the set of pixel characteristic data for each partition region based on the pixel-type distribution; that the pixel-type distribution within each partition region is based on a histogram of the one or more pixel types within each partition region; determining a distribution associated with one or more scene variables based on the set of pixel characteristic data of each of the partition regions; and determining a classification for the scene based on the distribution associated with the one or more scene variables.

The disclosure described herein is particularly advantageous in a number of respects. For instance, the scene classification technology disclosed herein is capable of classifying a scene type by analyzing an image stream from a moving platform where multiple, simultaneous classifications are generated for the image. The scene classification may capture the gist of the current view over multiple (e.g., two or more) dimensions. The scene classification technology also includes novel systems and methods for predicting characteristics of the scene. The scene classification output has numerous beneficial uses for advising and assisting a driver as discussed below in more detail.

The scene classification technology described herein can show the practicability of a lightweight computational approach for classifying scenes from a visual image by associating the image with a defined set of categories (e.g., the predicted scene characteristics) based on analysis of the current visual state. This technology offers the benefit of avoiding much of the complexity of object recognition methods by reducing the problem to a sequence of empirical machine learning tasks.

The technology described herein may include a novel scene classification algorithm that can advantageously extract information from the image-as-a-whole to avoid computationally expensive image processing steps. The technology may include a system having a cascade of at least two classifiers, where a first pixel-level classifier can reduce the original image to a set of pixel types, and a second classifier can use statistics of the pixel types as input data and estimate a set of labels associated with different scene variables as output data. For example, the second classifier can receive and summarize the output of the first classifier by assigning the classified pixel types to partition regions and then use statistics of the pixel type contents from each partition region as input data to a probabilistic model. Under this approach, the scene classification technology can advantageously infer a small number of discrete scene variables from the order of a million pixel values. Furthermore, by reducing the complexity of the image by the first classifier, the data processing load of subsequent steps may be greatly reduced and the image cycling time may be determined almost entirely by the efficiency of the first classifier.

Each classifier can be trained, for example, by a set of images that are manually labeled by their pixel types and scene characteristics. The first classifier may reduce the image to a manageably small amount of data that has adequate rich features to serve as input to the second classifier. The second classifier may classify the scene in several dependent dimensions that correspond to a set of scene variables by characterizing the scene using the most likely combination of labels associated with the scene variables. The system may generate a list of labels (e.g., one label from each scene variable category) as output when analyzing a video sequence. For example, the second classifier can be implemented as a probabilistic model where a set of scene variable nodes associated with the labels can be designated as output nodes. The list of labels can have a value indicating the uncertainty or confidence of the labels attached to the image.

It should be understood that the foregoing advantages are provided by way of example and the system may have numerous other advantages and benefits.

BRIEF DESCRIPTION OF THE DRAWINGS

The patent or application file contains at least one drawing executed in color. Copies of this patent or patent application publication with color drawings will be provided by the Office upon request and payment of the necessary fee.

The disclosure is illustrated by way of example, and not by way of limitation in the figures of the accompanying drawings in which like reference numerals are used to refer to similar elements.

FIG. 7B is a graphic representation illustrating an example evaluation result for scene classification.

DETAILED DESCRIPTION

Overview

Figure 1:
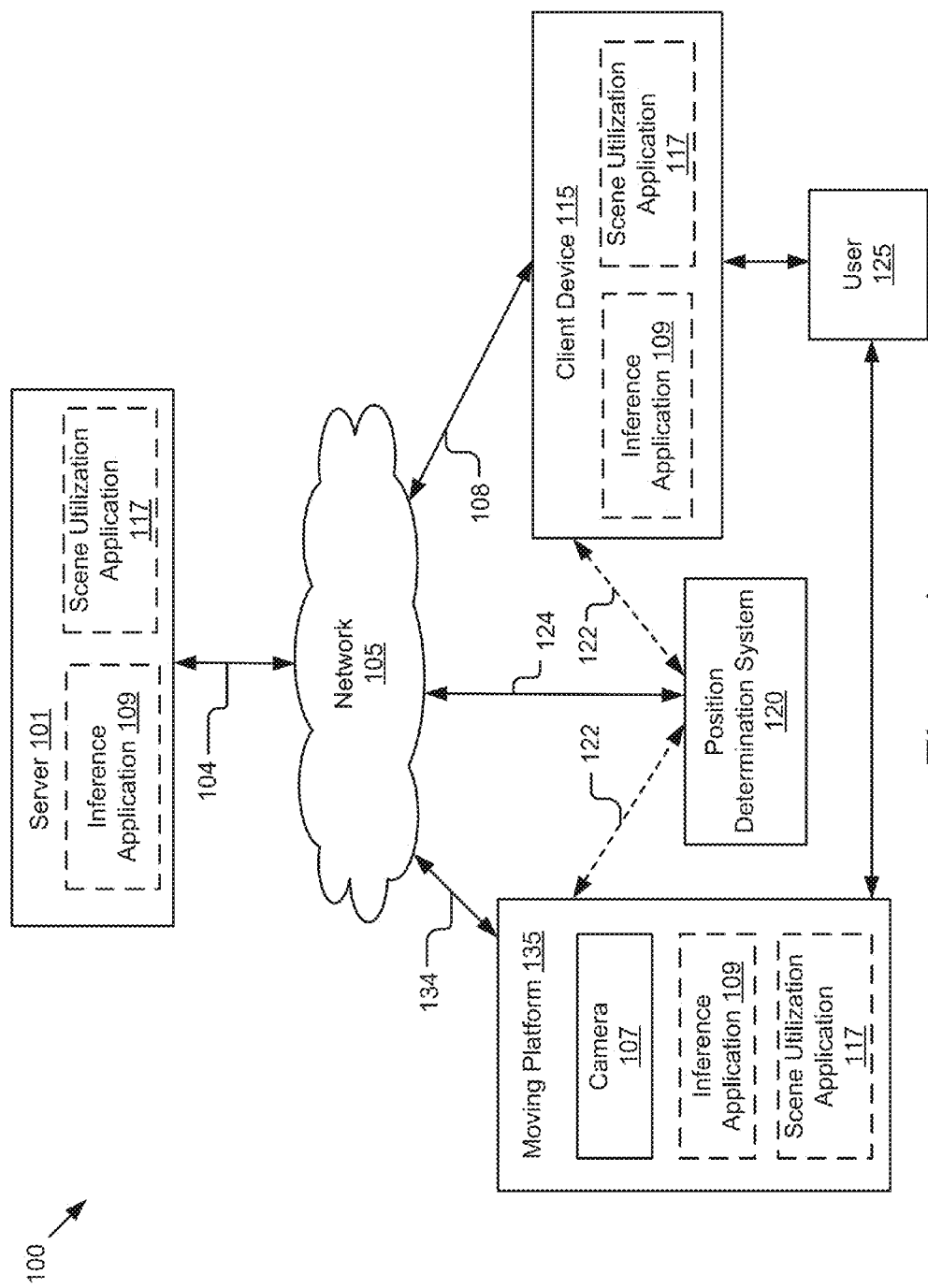
FIG. 1 is a block diagram illustrating an example system for inferring scenes from images.

FIG. 1 illustrates a block diagram of an example system 100 for inferring scenes from images according to some embodiments. The illustrated system 100 includes a server 101, a client device 115, and a moving platform 135. The entities of the system 100 are communicatively coupled via a network 105. In additional embodiments, the system 100 may include other entities not shown in FIG. 1 such as a map server for providing map information, a traffic server for providing traffic information, etc.

The network 105 can be a conventional type, wired or wireless, and may have numerous different configurations including a star configuration, token ring configuration, or other configurations. Furthermore, the network 105 may include one or more local area networks (LAN), wide area networks (WAN) (e.g., the Internet), public networks, private networks, virtual networks, and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the server 101, the client device 115 and the moving platform 135, in practice one or more networks 105 can be connected to these entities.

In some embodiments, the inference application 109a can be operable on the server 101, which is coupled to the network 105 via signal line 104. The server 101 can include a hardware and/or virtual server that includes a processor, a memory and network communication capabilities. In some embodiments, the server 101 can send and receive data to and from one or more of the client device 115 and the moving platform 135. In some embodiments, the server 101 may include a scene utilization application 117a for utilizing a classified scene of an image in various applications. Although FIG. 1 illustrates one server 101, moving platform 135, and client device 115, the system 100 can include any number of these entities coupled together either directly or via the network 105.

In some embodiments, the inference application 109b can be operable on the client device 115, which is connected to the network 105 via signal line 108. In some embodiments, the client device 115 can send and receive data to and from one or more of the server 101 and the moving platform 135. The client device 115 can include a computing device that includes a memory and a processor, for example a laptop computer, a desktop computer, a tablet computer, a mobile telephone, a personal digital assistant (PDA), a mobile email device or any other electronic device capable of processing information and accessing a network 105. In some embodiments, the client device 115 may include a scene utilization application 117b for utilizing a classified scene of an image in various applications. The user 125 can interact with the client device 115. Although FIG. 1 illustrates one client device 115, the system 100 can include one or more client devices 115.

In some examples, the inference application 109 can send data describing a scene classification result such as a classified scene of an image to the scene utilization application 117. The scene utilization application 117 can generate graphical data for providing a user interface that depicts the classified scene of the image. The scene utilization application 117 can present the user interface on a display device (not shown) coupled to the client device 115.

In some embodiments, the inference application 109c can be operable on a moving platform 135, which is coupled to the network 105 via signal line 134. In some embodiments, the moving platform 135 can send and receive data to and from one or more of the server 101 and the client device 115. The moving platform 135 can include any computing device that includes a memory and a processor. In some embodiments, the moving platform 135 can be a computing device that is capable of moving along a road. For example, the moving platform 135 can be one of a vehicle, an automobile, a bus, a bionic implant, or any other mobile system with non-transitory computer electronics (e.g., a processor, a memory or any combination of non-transitory computer electronics). The user 125 can interact with the moving platform 135. The user 125 can be a human user operating on the moving platform 135. For example, the user 125 can be a driver driving a vehicle. The moving platform 135 can include a camera 107 and a scene utilization application 117c for utilizing a classified scene of an image in various applications. Although FIG. 1 illustrates one moving platform 135, the system 100 can include one or more moving platforms 135.

The inference application 109 can include logic for inferring scenes from images. In some embodiments, the inference application 109 can be implemented using hardware including a field-programmable gate array (FPGA) or an application-specific integrated circuit (ASIC), software executable by a processor of a computer device, a combination of hardware and software, etc. In some embodiments, the inference application 109 may be stored in and distributed across a combination of the devices and servers, or in one of the devices or servers. The inference application 109 is described below in more detail with reference to at least FIGS. 2-4B.

The camera 107 can be an optical device for recording images including video images and still images. The camera 107 may capture frames of a video stream using any applicable frame rate, and may encode and/or process the video and still images captured using any applicable methods. In some embodiment, the camera 107 can record images of surrounding environments. For instance, in the context of a moving platform, the camera 107 can capture the environment around the moving platform 135 including roads, sky, mountains, other vehicles and/or objects (e.g., roadside structure, buildings, trees, etc.), etc. In some embodiments, the camera 107 can be facing forward and mounted in the front of the moving platform 135. In additional embodiments, the camera 107 can be mounted on other parts of the moving platform 135. In the context of a client device, the camera may be a forward or rear-facing camera, a set-top camera, etc. The camera 107 can send image data describing the images to the inference application 109. For example, the camera 107 can capture image data from the moving platform 135 (e.g., a vehicle) travelling on a roadway, where the image data depicts a scene including the roadway. The camera 107 can send the image data (e.g., real-time video stream) to the inference application 109 for processing and classification as discussed further elsewhere herein.

The scene utilization application 117 can include logic for utilizing scenes of images in various applications. For instance, the scene utilization application 117 may include a mapping application that leverages the scene being inferred by the inference application 109 to provide rich navigational functionality to the user. In some embodiments, the scene utilization application 117 can be implemented using hardware including a field-programmable gate array (FPGA) or an application-specific integrated circuit (ASIC), software executable by a computing device, a combination of hardware and software, etc. In some embodiments, the scene utilization application 117 may be stored in and/or distributed across a combination of the devices and servers, or in one of the devices or servers. The scene utilization application 117 is described below in more detail with reference to at least FIGS. 2 and 5.

The position determination system 120 is a system for determining the geographic location of the client device 115 and/or moving platform 135. In some embodiments, the position determination system 120 provides positioning signals to electronic devices configured to receive the signals, such as the client device 115 and moving platform 135. The position determination system 120 may provide the positioning signals via wireless transmitters and receivers as depicted by signal lines 122, via the network 105 as depicted by signal line 124, or via other suitable transmission mechanisms. The client device 115 and moving platform 135 may include receivers (e.g., GPS receivers, network interfaces, etc.) that receive positioning signals from the position determination system 120. The client device 115 and moving platform 135 may process the positioning signals to determine their respective geographic locations. In some embodiments, the position determination system 120 could include a global positioning system (GPS), a differential global positioning system (DGPS), an assisted global positioning system (A-GPS), etc., a telecommunications system including a multilateration or triangulation engine, a geolocation system capable of determining an approximate geolocation of a client device 115 or moving platform 135 using an IP address of the client device 115 or moving platform 135 on the network 105 by cross-referencing the IP address with other information sources, such as internet server provider databases, internet registries, etc., or other location systems and/or mechanisms.

It should be understood that in various embodiments any location-tracking system such as constellation systems like "hiball", magnetic tracking systems, optical tracking system, inertial tracking systems, etc. In addition, while the position determination system 120 is depicted as a monolithic entity, it may be combined with other entities of the system, including the server 101, the network 105, the client device 115, the moving platform 135, etc. The inference application 109 and/or the scene utilization application 117 may be coupled to and configured to receive position signals and/or location data from the position determination system 120. In some instances, this information may be accessible via an API.

Example Inference Application

Figure 2:
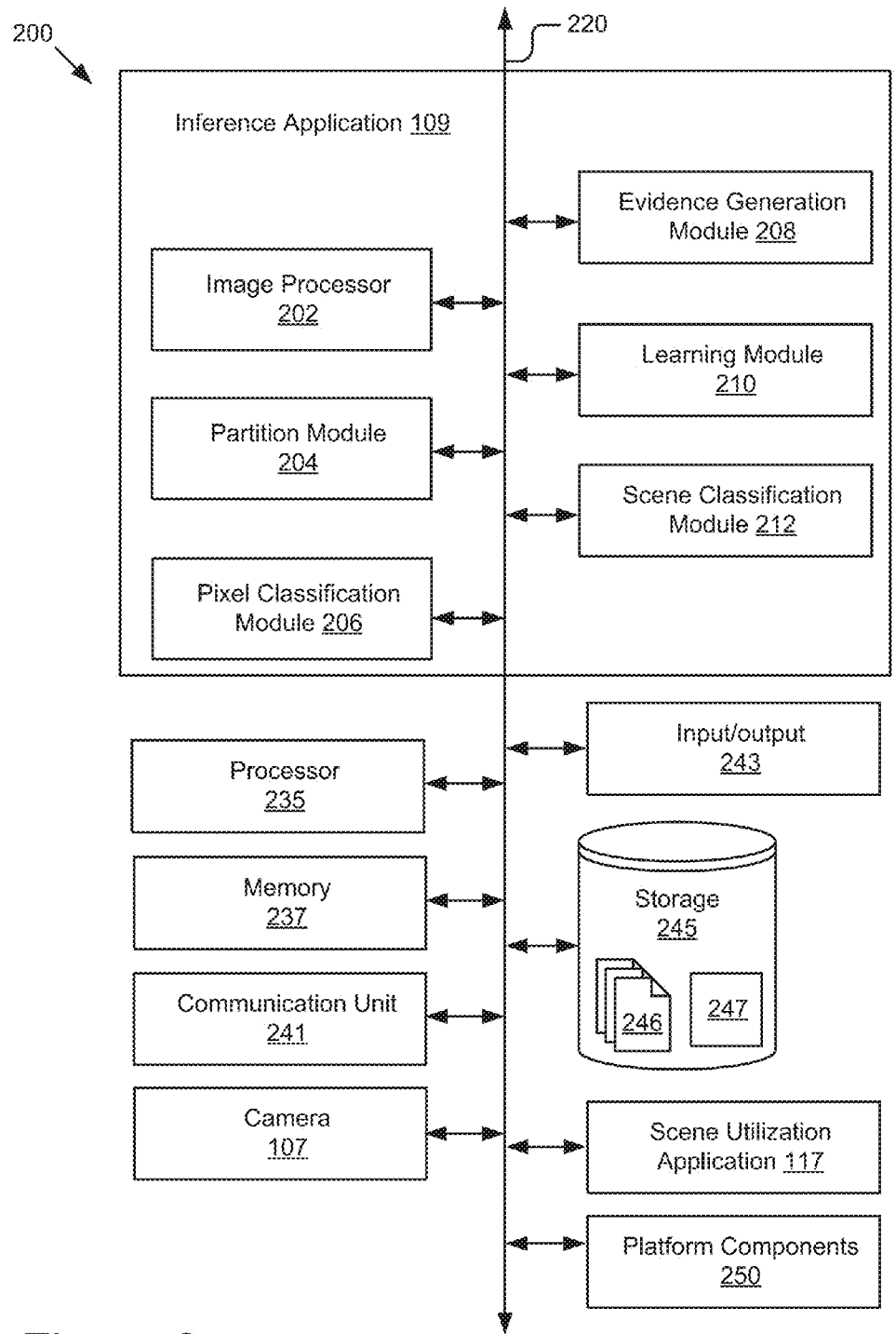
FIG. 2 is a block diagram illustrating an example computing device having an example inference application and utilization application.

Referring now to FIG. 2, an example computing device having an example inference application 109 and scene utilization application 117 is shown in more detail. FIG. 2 is a block diagram of a computing device 200 that includes an inference application 109, a processor 235, a memory 237, a communication unit 241, an input/output device 243, a storage device 245, a scene utilization application 117, and a camera 107 according to some embodiments. The components of the computing device 200 are communicatively coupled by a bus 220. The bus 220 can be any type of conventional communication bus for transferring data between components of a computing device, or between computing devices. In various embodiments, the computing device 200 can be a server 101, a client device 115, or a moving platform 135.

The processor 235 includes one or more processing units, such as an arithmetic logic unit, a microprocessor, a general-purpose controller, or some other processor array to perform computations and provide electronic display signals to a display device. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 includes one or more non-transitory computer-readable media for storing instructions and/or data that can be executed by the processor 235. The instructions and/or data may include code for performing the techniques described herein. In some embodiments, the memory 237 stores the inference application 109 and/or the scene utilization application 117. The memory 237 may include a dynamic random access memory (DRAM) device, a static random access memory (SRAM) device, embedded memory, flash memory, or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from one or more of the server 101, the moving platform 135, and the client device 115 depending upon where the inference application 109 is stored. The communication unit 241 may be coupled (wiredly, wirelessly, etc.) to the network 105 to communicate with other entities forming the network 105. In some embodiments, the communication unit 241 may include one or more network interfaces and/or ports for direct physical connection to the network 105 or to another communication channel. For example, the communication unit 241 may include a USB, SD, CAT-5 or similar port for wired communication with the client device 115. In some embodiments, the communication unit 241 may include one or more wireless transceivers, such as positional data, and/or exchanging data with the client device 115 or other communication channels using one or more wireless communication methods, including IEEE 802.11, IEEE 802.16, BLUETOOTH®, dedicated short-range communications (DSRC) or another suitable wireless communication method. In some embodiments, the wireless transceivers may be or include receivers configured to receive positional data including GPS signals or other positional signals describing the location of the computing device 200. While a single block is depicted for the communication unit 241 in FIG. 2, in practice the communication unit 241 may represent more than disparate or integrated communication devices.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS, and SMTP, etc.

The storage device 245 can be a non-transitory storage medium that stores data for providing the structure, acts, and/or functionality described herein. In some embodiments, the storage device 245 may include a database management system (DBMS) for storing and providing access to data. The storage device 245 may include solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information.

The storage device 245 can store a set of predetermined partition layouts that can be applied by the inference application 109 to images captured by the camera 107 to partition the images into one or more partition regions, as discussed in further detail herein. Additionally or alternatively, the storage device 245 can store images (video, still, etc.) captured by the camera 107, pixel types, pixel-type distributions for partition regions of an image (e.g., a histogram of the pixel types), pixel characteristic data the partition regions of an image (e.g., a likelihood vector for each partition region), a probabilistic model 247 that can be used to infer scenes from the images, learning datasets for learning the probabilistic model, scene variables, distributions associated with one or more scene variables, and scene classifications (e.g., sets of scene labels), etc. The data stored in the storage device 245 is described below in more detail. In some embodiments, the storage device 245 may store other data for providing the structure, acts, and/or functionality described herein.

In embodiments where the moving platform 135 includes or incorporates the computing device 200, the computing device may include and/or be coupled to various platform components 252 including, but not limited to, a platform bus (e.g., CAN), one or more sensors (e.g., one or more control units (e.g., ECU, ECM, PCM, etc.), automotive sensors, acoustic sensors, chemical sensors, biometric sensors, positional sensors (e.g., GPS, compass, accelerometer, gyroscope, etc.), switches, and controllers, cameras, etc.) an engine, drive train, suspension components, instrumentation, climate control, and/or any other electrical, mechanical, structural, and mechanical components that are necessary.

As depicted in FIG. 2, the inference application 109 may include an image processor 202, a partition module 204, a pixel classification module 206, an evidence generation module 208, a learning module 210, and a scene classification module 212, which may be communicatively coupled via the bus 220, the processor 235, and/or other components of the computing device 200.

The image processor 202 can be software including routines for pre-processing an image to reduce the amount of image data that needs to be classified. In some embodiments, the image processor 202 can include a set of instructions executable by the processor 235. In some embodiments, the image processor 202 can be stored in the memory 237 of the computing device 200 and can be accessible and executable by the processor 235. The image processor 202 may be adapted for cooperation and communication with the processor 235 and other components of the computing device 200.

Figure 10:
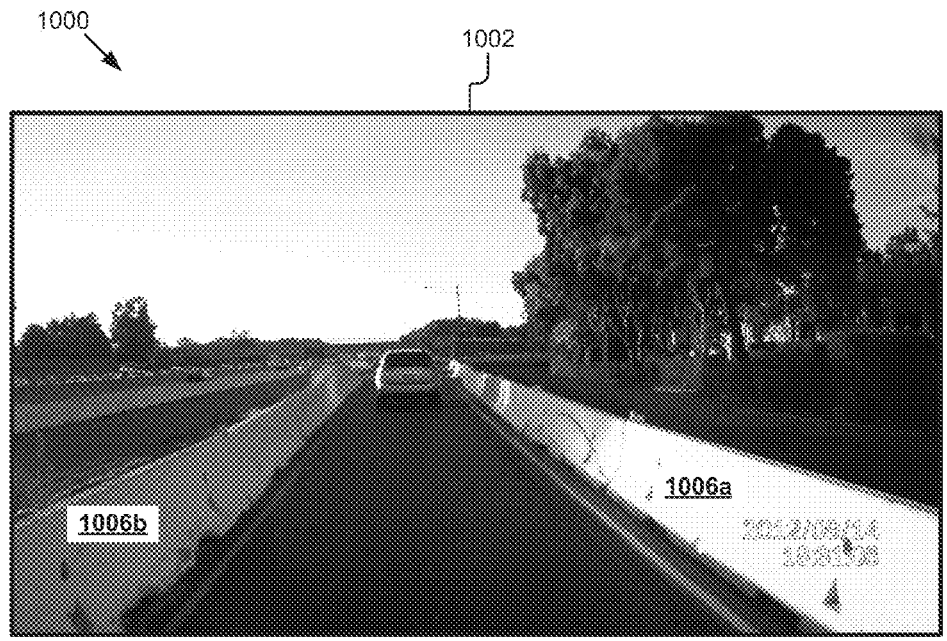
FIG. 10 is a graphic representation illustrating a further example of pixel level classification.
Figure 10:
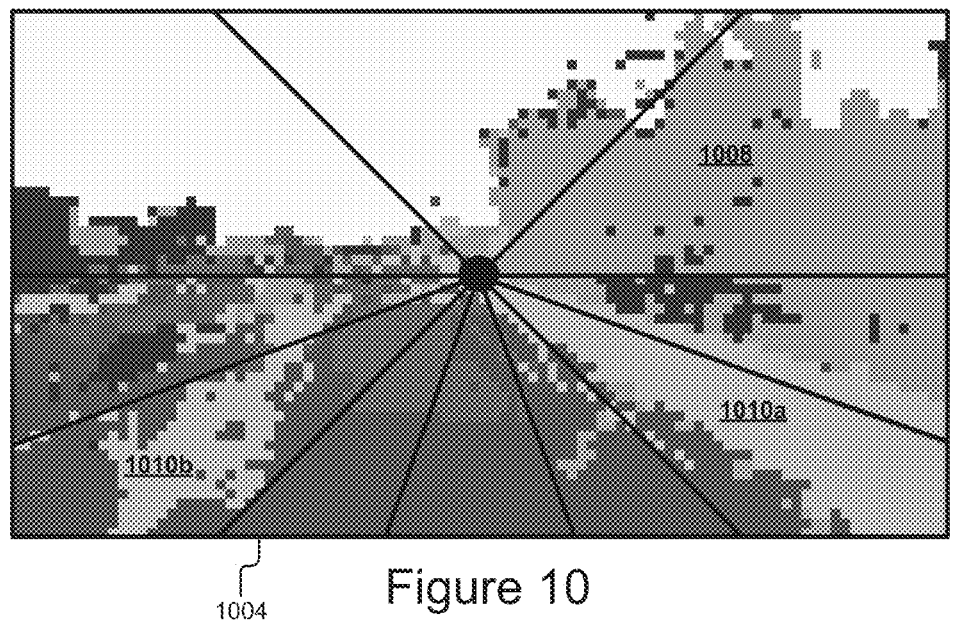

The image processor 202 can receive images from the camera 107, storage 245, and/or another component of the inference application 109. The image processor 202 can pre-process the image to reduce the amount of data that needs to be processed by the pixel classification module 206 and/or other components of the inference application 109, thereby improving the speed and/or efficiency in which images can be classified. In some embodiments, the image processor 202 can reduce the image down to a coarser array of patches. For example, the image processor 202 may reduce pixels in the image to generate a coarser array of patches. This can eliminate having to classify every pixel in the raw image captured by the camera 107 later on. In this example, the image processor 202 may in some cases only select pixels that correspond to a predetermined grid for inclusion in the down-sampled image. The down-sampled image may in some cases resemble a colored cartoon version of the original image since neighboring pixels tend to be similar to each other, as depicted in FIG. 10. Other down sampling, averaging, and/or compression techniques may be also used to reduce the original set of pixels down to a coarser array of pixels (also called patches). The image processor 202 can process an image before or after the partition module 204 partitions the image. The image processor 202 may send the image, as processed, to the partition module 204 and/or the pixel classification module 206.

The partition module 204 can be software including routines for determining partition layouts for images. In some embodiments, the partition module 204 can be a set of instructions executable by the processor 235. In some embodiments, the partition module 204 can be stored in the memory 237 of the computing device 200 and can be accessible and executable by the processor 235. The partition module 204 may be adapted for cooperation and communication with the processor 235 and other components of the computing device 200.

To determine a partition layout, the partition layout can estimate the scene that will be/is depicted by an image captured by a camera 107 of the moving platform 135 and select a corresponding partition layout based on the estimation. The scene may reflect the oncoming roadway environment in which the moving platform 135 is traveling. In some embodiments, the camera 117 can be mounted on the moving platform 135 and face forward as the moving platform 135 moves to capture the scene in front and to the forward sides of the moving platform 135.

The partition module 204 can determine the partition layout independently of the image data of the image. For instance, the partition module 204 can identify a partition layout that corresponds to the scene depicted by the image without analyzing the image data to determine the scene depicted by it. Accordingly, the camera 107 may capture the image corresponding to the partition layout after, during, or before the partition layout is determined.

A partition layout includes one or more partition regions, which may be configured corresponding to various visually distinguishable and/or distinct elements of a given type of scene. In some embodiments, a scene may include elements such as, but not limited to, the route (e.g., roadway), physical surroundings, operating (e.g., road) conditions, the dynamic environment (e.g., weather), obstacles, etc. In some embodiments, the partition layout predictively determined by the partition module 204 may include partition regions having shapes that roughly corresponding to the primary elements included in the scene.

The characteristics of a partition layout may be predefined, defined, and/or adjustable by the partition module 204 at runtime, a combination of the forgoing, etc. The characteristics may include the orientation of the partition layout, the dimensions of the partition layout, the number of partition regions included in the partition layout, the number of corresponding sets of partition regions, the geometry (e.g., size and shape of the partition regions, the orientation of the partition regions, etc.) of the partition regions, etc. For instance, the size, shape, and orientation of a set of the partitions regions of a given partition layout may have predefined default values which are adjustable by the partition module 204 at runtime based on one or more contextual attributes, as discussed elsewhere herein.

A given partition region can various shapes or sizes. For example, a partition region can have a wedge shape, a triangular shape, a circular shape, a sector shape, or any other geometric shape. The partition regions of a given partition layout may be uniform, non-uniform, similar, dissimilar, symmetric, dissymmetric, a combination of the foregoing, etc., relative to one another. Various partition regions may be concentrically arranged within a given partition layout. A combination of different shapes may be used for the partition regions, or the partition regions may have the same or similar shape. The dimensions of some or all of the partition regions may be coordinated or uncoordinated. The partition regions may vary dimensionally from one another, or some or all of the partition regions may have equivalent dimensions.

By way of further illustration and not limitation, FIGS. 6A-6E are graphic representations of example partition layouts 600, 605, 610, 620, and 625, respectively. As shown, the partition regions of these layouts can have a triangular shape, a trapezoid shape, a semi-circular shape, or other geometric shapes. The partitions regions can be bounded by lines and converge or intersect with a central point 626. For instance, as shown in Figures X, partition regions may have varied sizes, non-linear boundaries, and some partition regions may surround the central point 626.

In some embodiments, the partition module 204 may determine the partition layout based on one or more contextual attributes. A contextual attribute can describe an aspect of the moving platform 135 or its operating environment. The contextual attribute may be determined or derived from context data. In some embodiments, the context data may include one or more of operational data of the moving platform 135 captured at or around the time the corresponding image was captured, positional data describing the geographic location of the roadway and/or the moving platform 135, surroundings data describing the landscape of the geographic location; driving condition data corresponding to the geographic location of the moving platform 135, event data corresponding to the geographic location of the moving platform 135, current time and date, etc.

For example, assume the scene to be classified by the inference application 109 is an outdoor roadway scene with sky above, road below and surrounding characteristic of the scene on the left side and right side of the image, such as the scene illustrated in FIG. 6O. The partition module 204 can estimate that the scene depicted in the image is a rural roadway scene based on one or more contextual attributes and select a portion layout that divides the scene into a set partition regions. For instance, as depicted in FIG. 6O, the partition layout 675 includes a set of 12 wedge-shaped partition regions, where each region is bounded by lines emanating from the image center (e.g., a convergence point). As shown in this example, objects in the roadway scene tend to conform roughly to the wedge-shaped partition regions bounding them. For example, the horizon may fall within one or more partition regions and the road surface may fall within one or more other partition regions. This is advantageous as it can allow the inference application 109 to divide the image up into relevant parts (reflected by the partition regions) without having to analyze the image-level data, which can be CPU intensive and introduce latency. It also can improve the performance quality of the subsequent classification and/or to allow more efficient usage of a multi-core or parallel processor 235. FIGS. 6P and 6Q are further examples of partition layouts 680 and 685 overlaid onto a corresponding image depicting a scene.

The partition module 204 may receive the operational data from one or more platform components 250, data storage such as the storage 245, and/or another suitable component. The operational data may describe the state of the moving platform 135 including acceleration, speed, braking, force, driving profile, temperature, humidity, vibration, pressure, sound, gas mileage, time and date, distance between platform and other external objects (e.g., roadside structure, traffic lights, other vehicles, pedestrians, cyclists, etc.), system safety parameters (e.g., airbag, anti-lock braking, etc.) a direction of travel, fuel tank level, battery charge level, and other physical and/or dynamic aspects of the moving platform 135.

The partition module 204 may receive the positional data and/or the driving condition data from the communication unit 241, one or more sensors 250, data storage such as the storage 245, the scene utilization application 117 which may include a navigation unit (e.g., GPS), a mapping, traffic, and/or weather server coupled to the network 105 and configured to provide such data (e.g., via APIs, push/pull, etc.), and/or another suitable component. The positional data may include location data (e.g., GPS coordinates) describing the location of the moving platform 135, travel history, and/or timestamp data describing the current time and date, speed of the moving platform 135. The driving condition data may include traffic information and updates, incident reports, expected delays, etc., associated with the location of the moving platform 135. Additionally or alternatively, the partition module 204 may determine the current time and date data from timestamp data received from an operating system of the computing device 200, a time and date server coupled to the network 105 (not shown), or another similar component of the system 100.

The partition module 204 may receive surroundings data from an event engine (not shown) operable by a computing device 200 of the system 100 (e.g., a mapping, search, and/or informational server), data storage such as the storage 245, and/or another suitable component. The surroundings data may describe the features of the land associated with different geographic locations, including mountains, hills, water bodies, vegetation, buildings and structures, etc. In some embodiments, the surroundings data may be derived by the inference application 109 from maps (e.g., satellite maps) depicting the features of a given location.

The partition module 204 may receive event data from an event engine (not shown) operable by a computing device 200 of the system 100, data storage such as the storage 245, and/or another suitable component. For example, a server system (not shown) may be coupled to the network 105 that provides calendaring, scheduling, and social networking services, electronic mail, current events, and/or other distributed software services to its end users, and the partition module 204 may receive event data from that system via the network 105. The event data may describe one or ongoing or future events occurring in the current location or an approaching location along a travel route of the vehicle (e.g., as determined from positional data).

The following are additional non-limiting examples of determining partition layouts based on one or more contextual attributes. The context attribute could include a time of day, such as a weekday during rush hour, and the partition module tool 204 may determine a partition layout configured to correspond to a roadway with heavy traffic, such as a partition region for each adjacent lane, an exit, or merging lane, a shoulder of the roadway, roadway barriers, traffic lights, etc. The context attribute could include an amount of traffic, and the partition module 204 may determine a partition layout including a set of partition regions that correspond to that amount of traffic. For instance, if the traffic in a roadway image is light, the partition layout may be less detailed and include fewer regions then if the traffic was heavy because there are likely fewer objects, conditions, areas of interest, etc., in the roadway scene as compared to a roadway scene with heavy traffic. The context attribute could include an incident from an incident report (e.g., received by a GPS unit of the vehicle), and the partition module 204 may determine a partition layout adapted to one or more attributes of the incident report, such as include one or more regions corresponding to a side of the roadway that the incident occurred on.

The context attribute could describe a type of vehicle that is being driven, and the partition module 204 may determine a corresponding partition layout optimized for that type of vehicle (e.g., the vehicle size, with, capability, etc.). The context attribute may describe the type of roadway being driven on by the vehicle, and the partition module 204 may determine a corresponding partition layout (e.g., having matching regions) for that type of roadway (e.g., a two-lane highway, a four-lane freeway, a bridge, a tunnel, a city street, a one-way street, a dirt road, etc.). The context attribute could include an area in which the vehicle is traveling, such as the city, a rural area, a suburban area, a commercial area, etc., and the partition module 204 may determine a partition layout including regions adapted to common attributes of those areas (e.g., a partition region for the horizon, an open field, the sun, buildings, sidewalks, parking stalls, etc.). The context attribute could include a driver attribute, such as a driver age and/or gender, and the partition module 204 may determine a partition layout configured for that type of driver, such as a partition layout configured for scenes that young drivers typically frequent versus a separate partition layout configured for scenes that older drivers typically frequent. The context attribute could include an event type occurring at a location, such as a concert where a lot of vehicle and pedestrian traffic typically occurs, and the partition module 204 may determine a partition layout configured for that type of scene.

The context attribute could include data describing a partition layout used by another vehicle and the partition module 204 may determine a corresponding partition layout to apply. The other vehicle may have previously driven along the roadway and its learning module 210 may have learned which partition layout the most effective for classifying the roadway scene. This is advantageous as it allows the vehicles of the system 100 to share partition layouts, particularly improved partition layouts learned by the learning modules 210 of those vehicles. As a further example, the inference application 109 included in the moving platforms 135 of the system 100 may be configured to share the partition layouts with one another by sending partition layouts to one another (e.g., directly, via the server 101 and the instance of the inference application 109 operable thereby), etc. For instance, vehicles provisioned with communications technology may share their preferred partition layout data and usage criteria with other vehicles and central servers (e.g., server 101) for classification of roadway images by instances of the inference application 109 included in those vehicles. In some embodiments, the server 101 can include a dynamic centralized repository of partition layouts that is continuously updated with preferred, new, improved, etc., partition layouts determined by the instance of the inference applications 109 included in the moving platforms 135. The instances of the inference applications 109 on the moving platforms 135 may query or synchronize with the centralized repository to access these preferred, new, improved, etc., layouts, and the partition module 204 may use them when determining a partition layout.

It should be understood that the partition module 204 can use any number of contextual attributes to determine the partition layout. This is advantageous as an appropriate partition layout can be determined for nearly any type of roadway scene depicted by an image without having to analyze the pixels of the image, thus improving the processing speed and performance of the inference application 109. It also allows the partition module 204 to estimate a more precise partition layout for a roadway scene, particularly when the roadway scene is difficult to discern from just one contextual attribute. In some embodiments, as contextual attributes change during travel, the currently selected partition layout may be modified or a different partition layout may be selected for use. In some instances, (re)determination of a partition layout may be triggered by a timer, coincide with the frame rate of the camera 107, other regular or irregular trigger events, etc.

In some embodiments, a collection of partition layouts may be predefined (e.g., machine learned, manually preconfigured, a combination of the forgoing), and layout data describing the predetermined partition layouts may be stored in a storage device, such as the memory 237, the storage 245, or another storage device included in the system 100. In some embodiments, the partition module 204 can determine a partition layout for a scene depicted by an image at least in part by selecting the partition layout from storage based on one or more contextual attributes, and in some cases, modifying the partition layout based on one or more contextual attributes, as discussed elsewhere herein. In some embodiments, data (e.g., a variable, data structure, object, etc.) forming the partition layouts can characterize the number and shape of the partition regions forming the layout.

To optimize selection of the partition layout by the partition module 204, the learning module 210 may be trained on which partition layouts should be selected by the partition module 204 for particular scene types (e.g., roadway environments) using test data image sets along with corresponding contextual attributes (e.g., vehicle orientation and location data). This is advantageous as it can maximize the desired classification parameters determined by the pixel classification module 206 and/or scene classification module 212. In some cases, for the training, the partition layouts may at least partially be manually configured and associated with the test images. Learning data reflecting the training may be stored by the learning module 210 in the storage 245 and the partition module 204 may query this data when making a partition layout determination to optimize the determination being made.

A partition layout may include one or more sets of the partition regions. The partition regions of each set may converge at a certain point within an area of the layout. The certain point can be referred to as a convergence point or central point for that set of partition regions. Eventually, when a partition layout is applied to the image of the scene, the central point included in the partition layout may be located anywhere within the image area of the corresponding image. The central point may be a reference point that can set an expectation that determines one or more aspects used during classification of the scene. An expectation may be an anticipation/presumption about the optimal way to divide up the image for analysis. In some cases, it may be anticipated that a particular detail or area of interest will appear in the image, and the partition module 204 may place the central point in location that corresponds to that area of the image once applied to the image. By way of further illustration, it may be determined that the vehicle is approaching an intersection, so the partition module 204 may select and/or adapt a partition layout that places a central point in the vicinity of where the traffic lights appear. In this example, the expectation is that the scene will include traffic lights because the vehicle is arriving at the intersection. In another example, the partition module 204 may know (e.g., based on location data) that some features of a scene in the image may be less informative (e.g., wide open sky) and can adjust the central point (e.g., by adapting a partition layout, selecting a corresponding partition layout, a combination of both, etc.) so that the sky falls largely in one region.

In some embodiments, the central point and its associated set of partition regions may correspond to anticipated image regions that may be associated with significant data classification targets, such as significant classifiable driving conditions, road obstacles, roadway characteristics, surroundings, etc. In some embodiments, the central point may be defined or adapted to be located at a center of the image, a predicted visual "center of gravity" where various elements in the image appear to converge, a predicted vanishing point or an epipole of the image, a predicted juncture or convergence point of various features in the image, etc. An epipole can be a point where other points in an image appear to be emanated from.

Figure 6A:
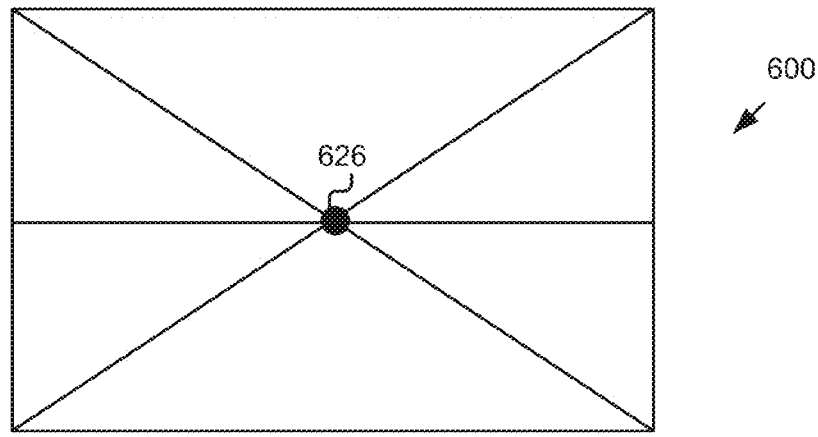
FIGS. 6A-6E and 6K are graphic representations illustrating example partition layouts.
Figure 6B:
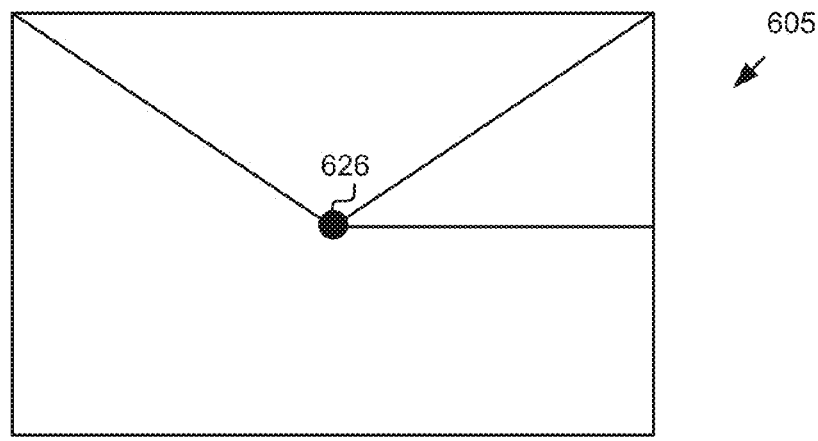
Figure 6C:
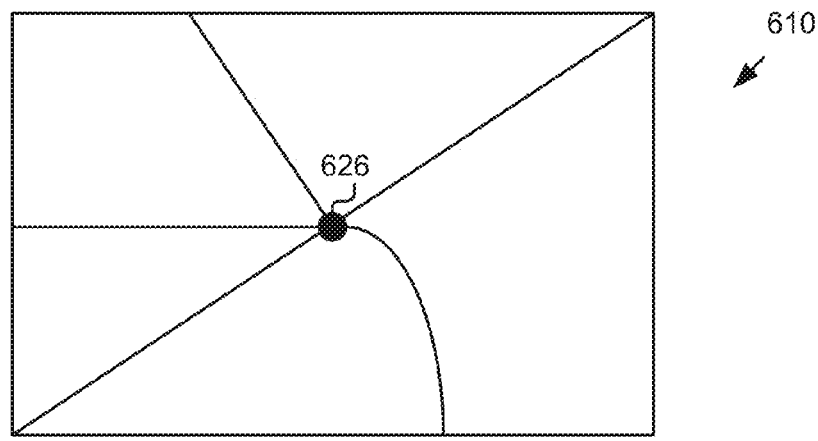
Figure 6D:
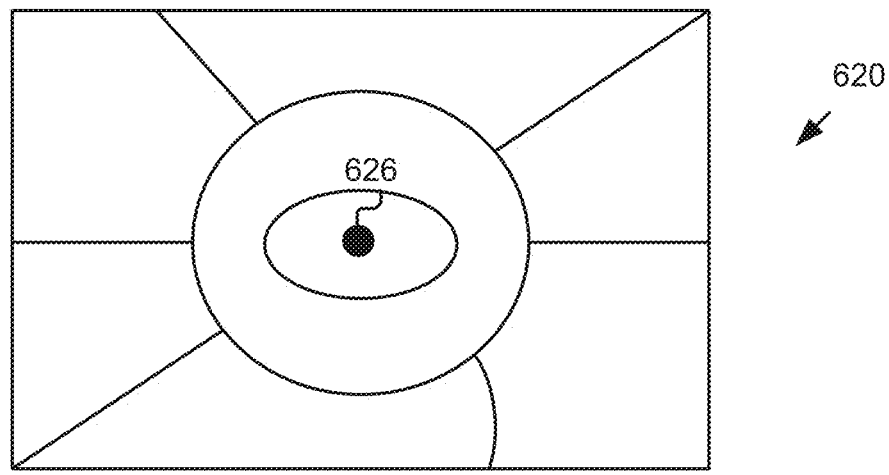
Figure 6E:
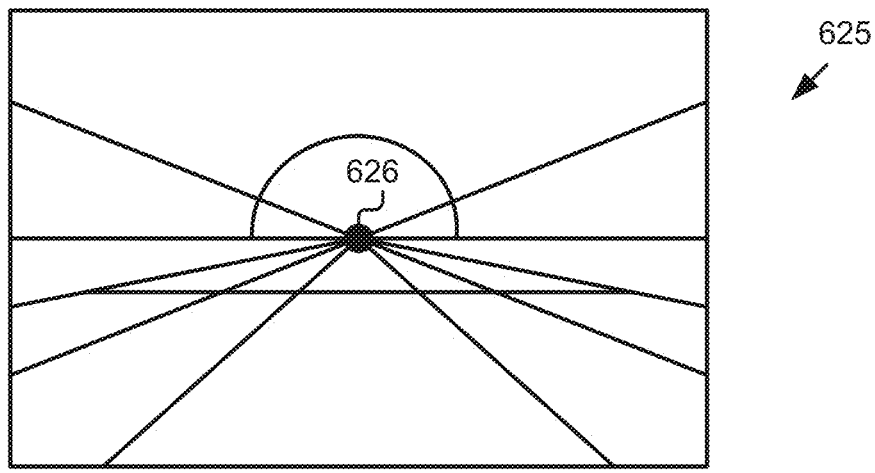
Figure 6F:
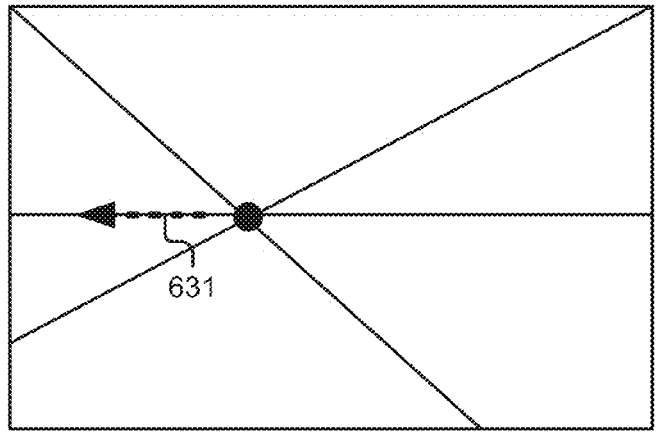
FIGS. 6F-6I and 6L-6N are graphic representations illustrating coordination of a central point with vehicle data.
Figure 6G:
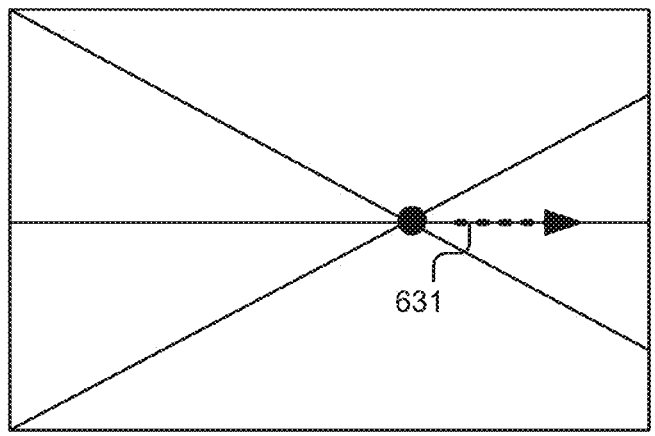
Figure 6H:
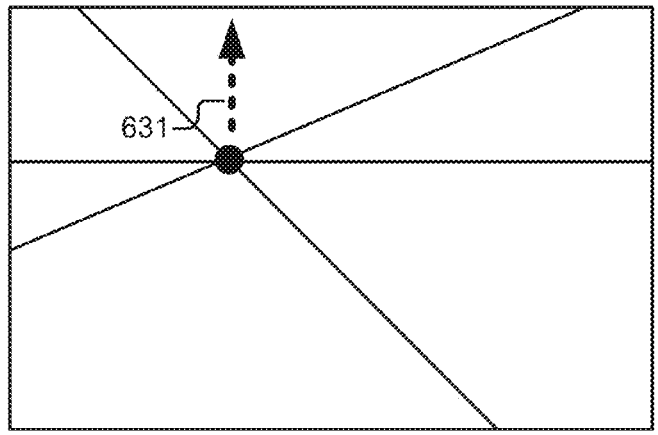
Figure 6I:
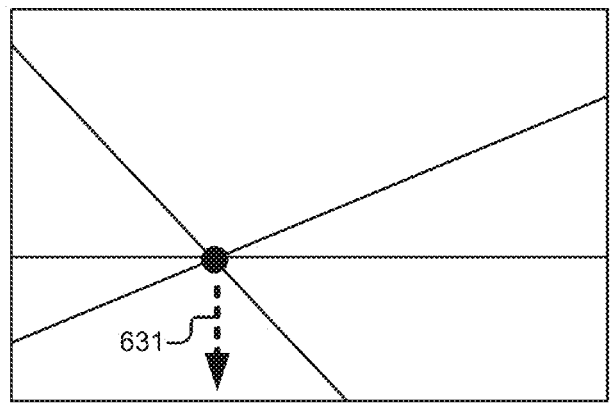
Figure 6J:
FIG. 6J is a graphic representation illustrating an example of pixel-level classification.
Figure 6K:
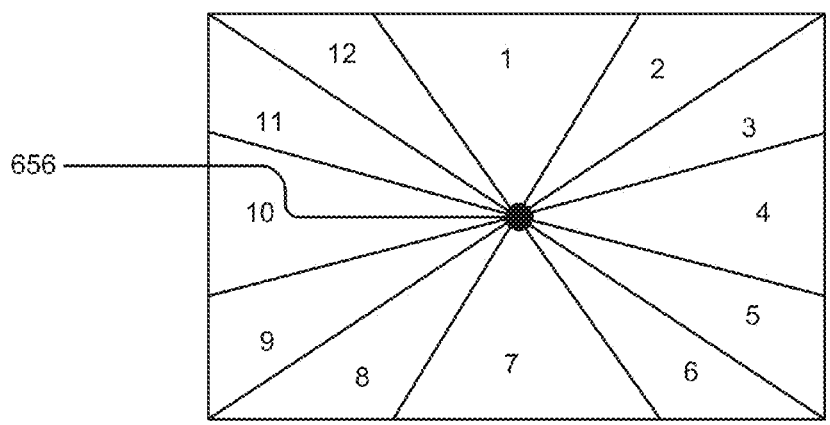
Figure 6L:
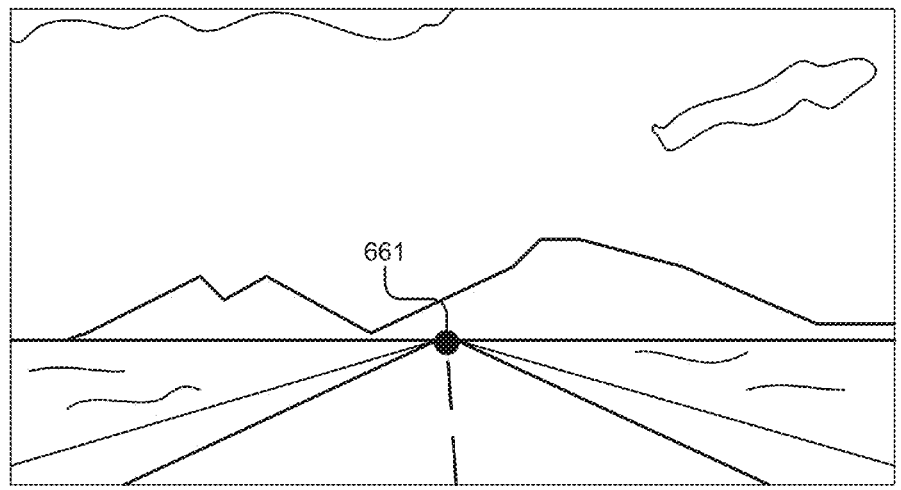
Figure 6M:
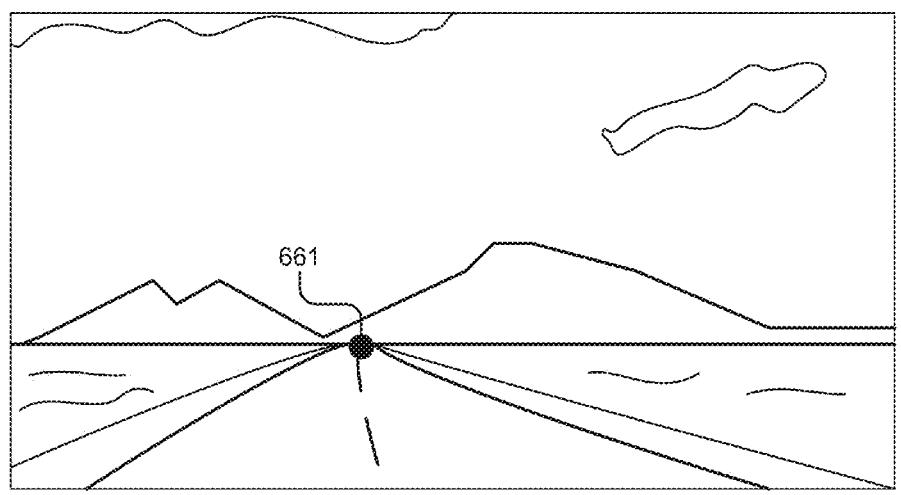
Figure 6N:
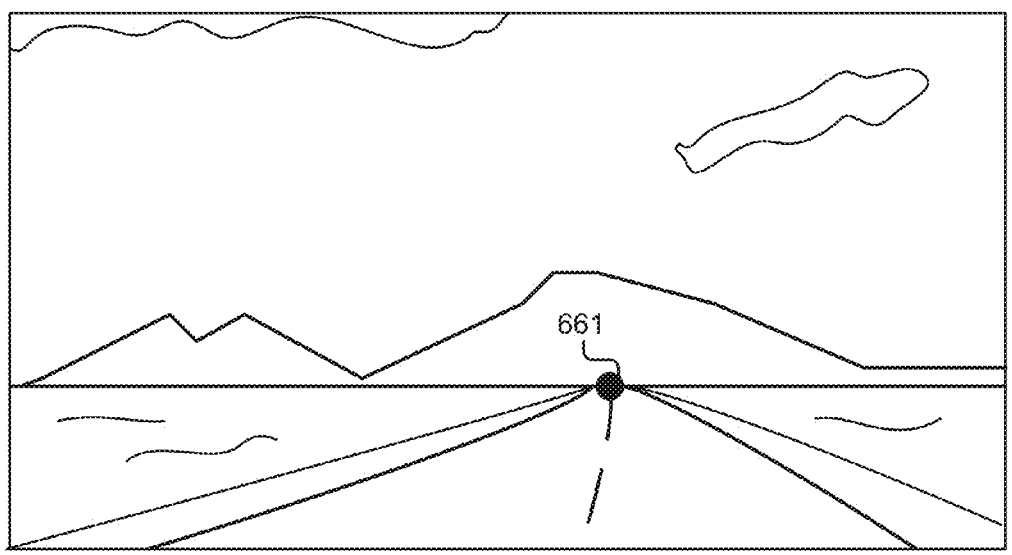
Figure 6O:
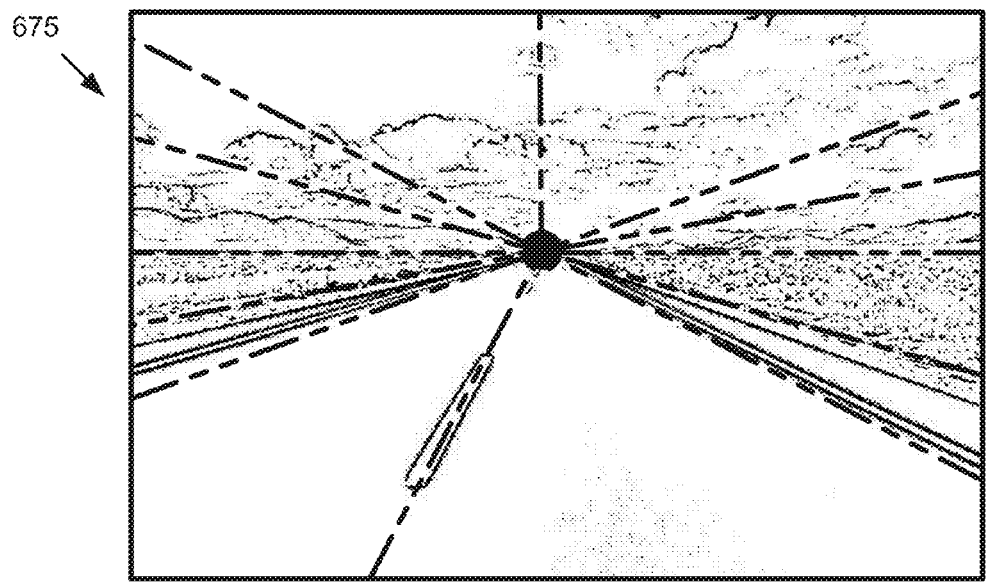
FIGS. 6O-Q are graphic representations illustrating partition layouts for different roadway scenes.
Figure 6P:
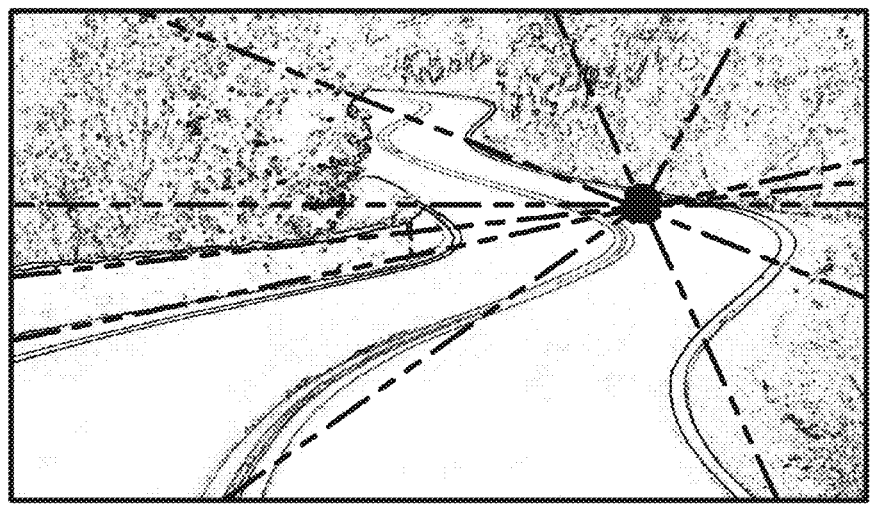
Figure 6Q:
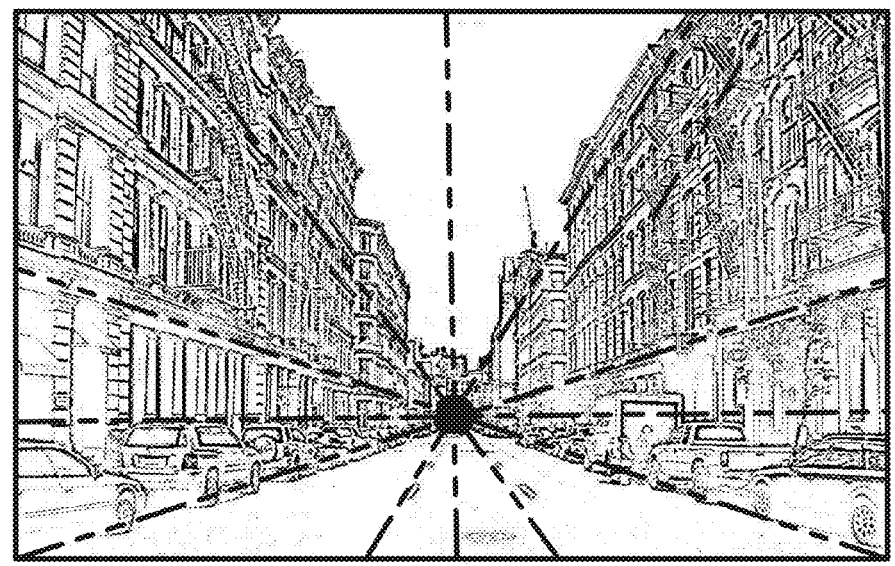
Figure 6R:
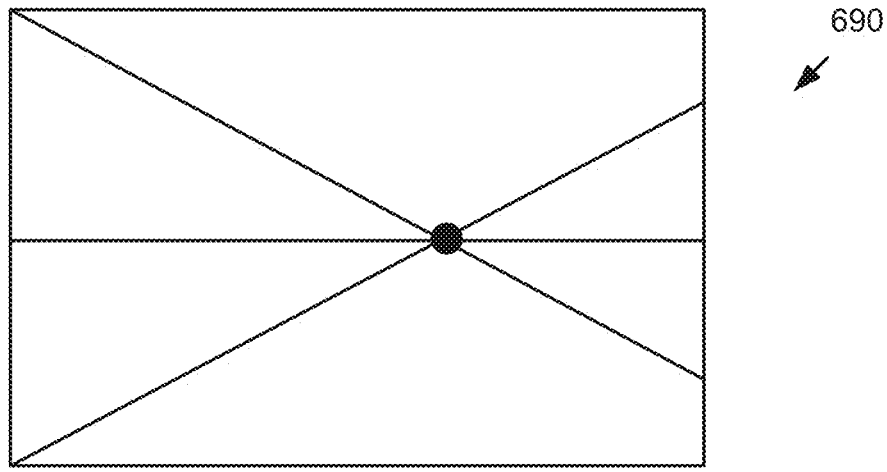
FIGS. 6R and 6S are graphic representations that collectively depict two partition layouts applicable to a given image.
Figure 6S:
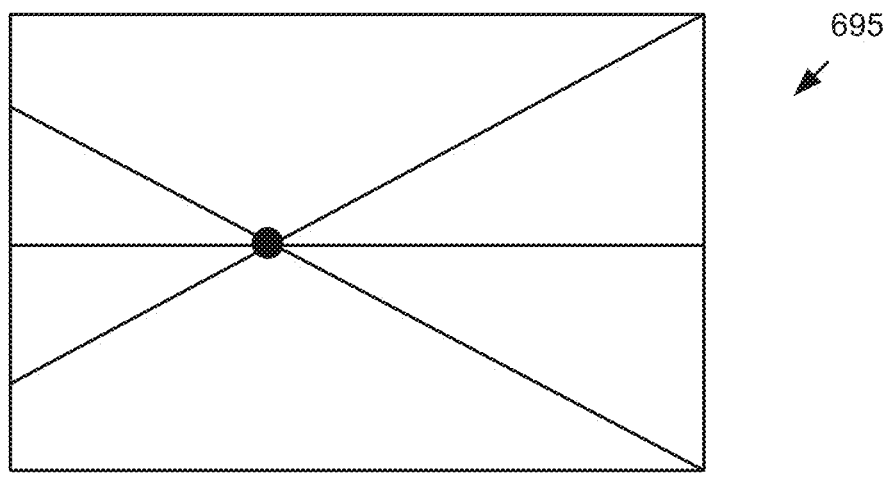

FIGS. 6R and 6S collectively depict two partition layout determinations for a single image (e.g., video image frame). The partition layout determination 690 is adapted for classifying right side targets from the image and the partition layout determine 695 is adapted for classifying left-side targets from the image (e.g., by the pixel classification module 206). The partition module 204 can overlay multiple partition layout determinations for a single image (e.g., video frame) with each having a different central point. This allows pixel classification module 206 to establish multiple image classification sets (e.g., left-side-focused, right-side-focused) for a single.

In some examples, the central point may be representative of a hub for a set of corresponding partition regions in the partition layout. For example, when a partition layout determined by the partition module 204 is applied to a corresponding image, the partition regions may extend outwardly from the central point to an edge corresponding to an edge of the image, as depicted in FIGS. 6O and 6Q. As shown, the central point may be configured to correspond to a vanishing point of a roadway, and the partition regions may divide the image into two or more partition regions that emanate from the vanishing point of the roadway.

A predefined partition layout may include default central point locations within the partition layout, which may be modified by the partition module 204 at runtime based on one or more of the learning data and context data. In some embodiments, the partition module 204 may adjust the location of a central point based on one or more contextual attributes, such as the orientation, movement, and/or motion (e.g., acceleration, velocity, cornering, deceleration, positional inflection, ascension, descension, direction, etc.) of the moving platform 135, position of the moving platform (e.g., geographic location, route estimate, range data, etc.), etc. For instance, two or more partitions associated with a central point may move in coordination with vehicle motion.

By way of further illustration, FIGS. 6A and 6F-6I are graphic representations illustrating the dynamic coordination of a central point 631 with the vehicle context at different points in time, as computed by the partition module 204 based one or more contextual attributes, such as dynamics of the movement platform 135 and/or location of the movement platform 135. In a steady state, as determined from one or more contextual attributes, the partition layout may appear like it does in FIG. 6A. When turning to the right, the partition module 240 may reshape the partition regions by shifting the central point 631 to the left based on one or more contextual attributes indicating that the vehicle is turning to the right (e.g., sensor data, map data, etc.), as shown in FIG. 6F. When turning to the left, the partition module 240 may reshape the partition regions by shifting the central point 631 to the right based on one or more contextual attributes indicating that the vehicle is turning to the left (e.g., sensor data, map data, etc.), as shown in FIG. 6G. When ascending and turning to the right, the partition module 240 may reshape the partition regions by shifting the central point 631 to the lower-left based on one or more contextual attributes indicating that the vehicle is ascending and turning to the right (e.g., sensor data, map data, etc.), as shown in FIG. 6H. When descending and turning to the right, the partition module 240 may reshape the partition regions by shifting the central point 631 to the upper-left based on one or more contextual attributes indicating that the vehicle is descending and turning to the right (e.g., sensor data, map data, etc.), as shown in FIG. 6I.

FIGS. 6L-6M, illustrate further examples of dynamic coordination of a central point with the vehicle context. In these figures, the partition regions have been omitted to not obscure aspects of the scene. FIG. 6L depicts a straight road with the central point 661 located at the vanishing point of the road within the scene. FIG. 6M shows the central point 661 shifted to the left based on a turn to the right. FIG. 6N depicts shows the convergence 661 point shifted to the right based on a turn to the left.

In some embodiments, the central point may be a reference point that is used by the partition module 204 to calculate where to how to modify the dimensions of the partition regions relative to the anticipated regions of the image in response to one or more contextual attributes (e.g., vehicle parameters such as vehicle orientation, velocity, route estimate, and map data).

The partition module 204 can send data describing the partition layout(s) determined and/or processed by it to one or more of the pixel classification module 206 and the evidence generation module 208, and/or may store the data describing the partition layout(s) in the storage 245 or the memory 237.

The pixel classification module 206 can be software including routines for classifying pixels of images to one or more pixel types. In some embodiments, the pixel classification module 206 can be a set of instructions executable by the processor 235 to provide the structure, acts, and/or functionality described below for classifying pixels of images to one or more pixel types. In some embodiments, the pixel classification module 206 can be stored in the memory 237 of the computing device 200 and can be accessible and executable by the processor 235. The pixel classification module 206 may be adapted for cooperation and communication with the processor 235 and other components of the computing device 200.

The pixel classification module 206 can receive data describing one or more partition layouts determined by the partition module 240 from the partition module 204 and/or the storage 245. The pixel classification module 206 can apply (e.g., overlay, match, etc.) the one or more partition layouts to the image to divide the image into the partition regions. In some embodiments, the pixels in the image can be divided by partition region (e.g., into M partition regions) by assigning each pixel to one region, $r_m=\{p_{ij}\}$, m=1, 2 ... M, to form contiguous sets of pixels.

Based on pixel-level features, the pixel classification module 206 can classify each pixel in each partition region to a pixel type from a discrete set of pixel types. In some embodiments, the set of pixel types can be predetermined by the pixel classification module 206.

A pixel type can be data describing a feature of the pixel, which represents a type of surface that can generate the pixel. Example pixel types include, but are not limited to, sky, foliage, building-structure, road-surface, lane, barrier-sidewalk, vehicle and pedestrian, etc. Example pixel-level features of a pixel include, but are not limited to, color of the pixel, texture of the pixel, etc. For example, the pixel classification module 206 can determine a color and a texture of a pixel, and determine a pixel type for the pixel based on the color and the texture. In a further example, if a color of a pixel is green, the pixel classification module 206 can determine a pixel type for the pixel as foliage. In some embodiments, a pixel can be an original pixel from an original image captured and/or processed by the camera 107, and the pixel features of the pixel include the pixel size, texture, and/or color of the original pixel. In some embodiments, an original image captured by the camera 107 can be converted to another format (e.g., from a raw format to a joint photographic experts group (JPEG) format, portable network graphics (PNG) format, etc.), and a pixel can be a converted pixel in the other format. The pixel features of the pixel include the pixel size, texture, and/or color of the converted pixel. In some additional embodiments, the original image captured by the camera 107 can be down-sampled by the image processor 202, and a pixel can be a down-sampled pixel in the down-sampled image. The pixel features of the pixel may include the pixel size, texture, and/or color of the down-sampled pixel, etc.

The pixel classification module 206 can determine a pixel-level classification result for each partition region, where the pixel-level classification result can classify each pixel (e.g., reduced pixel, patch, etc.) in the partition region into one or more pixel types. In some examples, two or more pixels can be classified into the same pixel type from the set of predetermined pixel types. In some additional examples, two or more pixels can be classified into different pixel types from the set of predetermined pixel types.

For example, consider an image of pixels $p_{ij}$ over i×j, each pixel being described by a vector of features $f_{ij}$. The features can be derived by a set of filters, e.g., for color and texture, centered at the coordinate (i, j). A pixel-level classifier can be a function from the domain of f to one of a discrete set of n pixel types, $C: f \rightarrow \{c_1, c_2 \ldots c_n\}$. The pixel-level classification result can be an array of classified pixel types.

The pixel classification module 206 can receive the image (e.g., a video frame, a photo, etc.) from the camera 107 and/or a controller thereof, from the memory 237, the storage 245, the image processor 202, or another component of the system 100. In some embodiments, the pixel classification module 206 can receive the image, as down-sampled, from the image processor 202, the memory 237, the storage 245, or another component of the system 100. The pixel classification module 206 can classify pixels in the down-sampled image to one or more pixel types by performing operations that are the same or similar to those described above. Even though local dependencies may be ignored in the down-sampled image, a pixel-level classification result for the down-sampled image may resemble a cartoon version of the image since neighboring pixels tend to be classified into the same pixel type. An example of the pixel-level classification result is illustrated with reference to FIG. 10.

In some embodiments, the pixel classification module 206 can send a pixel-level classification result for each partition region in the image to the evidence generation module 208. In additional embodiments, the pixel classification module 206 can store the pixel-level classification result for each partition region in the storage 245 or the memory 237.

The evidence generation module 208 can be software including routines for generating pixel characteristic data associated with partition regions of images based on the pixel classification data generated by the pixel classification module 206. In some embodiments, the evidence generation module 208 can be a set of instructions executable by the processor 235 to provide the structure, acts, and/or functionality described below for generating pixel characteristic data associated with partition regions of images. In some embodiments, the evidence generation module 208 can be stored in the memory 237 of the computing device 200 and can be accessible and executable by the processor 235. The evidence generation module 208 may be adapted for cooperation and communication with the processor 235 and other components of the computing device 200.

The evidence generation module 208 can receive a pixel-level classification result for each partition region of an image from the pixel classification module 206 and/or the storage 245, where the pixel-level classification result can include a pixel type for each pixel in that partition region. For each partition region, the evidence generation module 208 can determine a set of pixel characteristic data based on the pixel-level classification result associated with that partition region. For example, the evidence generation module 208 can determine a set of pixel characteristic data for the partition region based on the pixel types of the pixels in that partition region.

Pixel characteristic data associated with a partition region of an image can describe a portion of the image included in that partition region. For example, for a given partition region of the image, a set of pixel characteristic data characterizes one or more features of the object(s) depicted in that partition region. In some examples, the set of pixel characteristic data can be a statistical description of the pixel content in the partition region. For example, the set of pixel characteristic data can be a likelihood vector describing a distribution of a set of pixel levels within the partition region of the image. For example, a likelihood vector may describe that 57% of the pixel types in the partition region is road surface, 23% of the pixel types in the partition region is barrier, 15% of the pixel types in the partition region is foliage and 5% of the pixel types in the partition region is building-structure. Other example likelihood vectors are possible.

In some embodiments, the pixel characteristic data associated with a partition region can be a summary or qualification of the pixels in that partition region. For example, the pixel characteristic data can be a set of statistics or a histogram of pixels within that partition region.

As a further example, the evidence generation module 208 can determine a pixel-type distribution associated with a set of pixel types by generating a histogram for the set of pixel types within the partition region, where the pixel-type distribution may describe a probability distribution of the set of pixel types within the portion of the image included in the partition region. For example, each region can be described by a histogram of the pixel types within that region: $H_m = [|c_1|_m, \ldots |c_n|_m]$, where $|c_i|_m$ represents the count of the pixel type $c_i$ in the region m, and i=1, 2 . . . n. The evidence generation module 208 can generate the set of pixel characteristic data for the partition region as a likelihood vector based on the histogram. For example, the evidence generation module 208 may generate a likelihood vector for the partition region indicating that 80% of the pixels in the partition region can be classified into the sky pixel type, 15% of the pixels in the partition region can be classified into the foliage pixel type and 5% of the pixels in the partition region can be classified into the road surface pixel type.

A set of pixel characteristic data can be interpreted as a set of evidence data for a partition region, and the scene classification module 212 can use all the pixel characteristic data from all the partition regions as evidence to classify a scene in the image as described below in more detail. For example, the pixel characteristic data from each of the partition regions can be input data to a probabilistic model, and serve as evidence to the probabilistic model for determining a scene in the image. The probabilistic model is described below in more detail.

In some embodiments, the evidence generation module 208 can send pixel characteristic data associated with each partition region of the image to the scene classification module 212. In additional embodiments, the evidence generation module 208 can store pixel characteristic data associated with each partition region in the storage 245 or the memory 237.

The learning module 210 can be software including routines for learning a probabilistic model. In some embodiments, the learning module 210 can be a set of instructions executable by the processor 235 to provide the structure, acts, and/or functionality described below for learning a probabilistic model. In some embodiments, the learning module 210 can be stored in the memory 237 of the computing device 200 and can be accessible and executable by the processor 235. The learning module 210 may be adapted for cooperation and communication with the processor 235 and other components of the computing device 200.

A probabilistic model can be a model for classifying scenes of images. In some embodiments, a probabilistic model can be a probabilistic graphical model, such as a Bayes network. Example probabilistic models are illustrated with reference to FIGS. 8A and 8B. In some embodiments, the learning module 210 can retrieve a learning dataset that includes pixel characteristic data (e.g., virtual evidence data) associated with partition regions of images, where the scenes of images in the learning dataset are pre-classified and pre-labeled with a set of labels. The learning module 210 can perform learning of the probabilistic model using the learning dataset as described below in more detail. For example, the learning module 210 can learn the structure, input nodes, and output nodes of the probabilistic model using the learning dataset.

A Bayes network can be a factorization of a joint probability distribution into local probability models, each corresponding to one node in the network, where directed arcs between the nodes show the conditioning of one node's probability model on another's probability model. Inference (e.g., classification) can operate in the direction against the causal direction of the arc. Inference can flow from lower level evidence in the network upward to the class nodes (e.g., scene variable nodes) at the top of the Bayes network, where the Bayes network can generate the posterior distributions over the class variables (in this case, the scene variables).

The Bayes network can be easily re-learned under different partition inputs, different output categories, and different structural constraints. These output categories may be provided by the user and can, in some cases, include categories that are not in the current Bayes network. For example, the application can prompt the user to provide a description for the scene that may consider scene categories that are introduced by the user and not in the current Bayes network. The Bayes network can be re-learned from these examples to include these novel scene categories. The capability to easily modify the model to test different kinds of evidence as inputs or differently defined nodes as outputs is an advantage of the scene classification technology described herein. The structure of the model can discover dependencies among the model variables that reveal properties of the domain.

Learning the probabilistic model such as the Bayes network may include two aspects which are: (1) learning the input and output variables' structure; and (2) learning the parameters of the variable conditional probability tables. Learning the structure and the parameters can occur simultaneously. Constraints can be used to limit in-degree and node ordering. Learning of the Bayes network can be performed interactively.

Figure 8A:
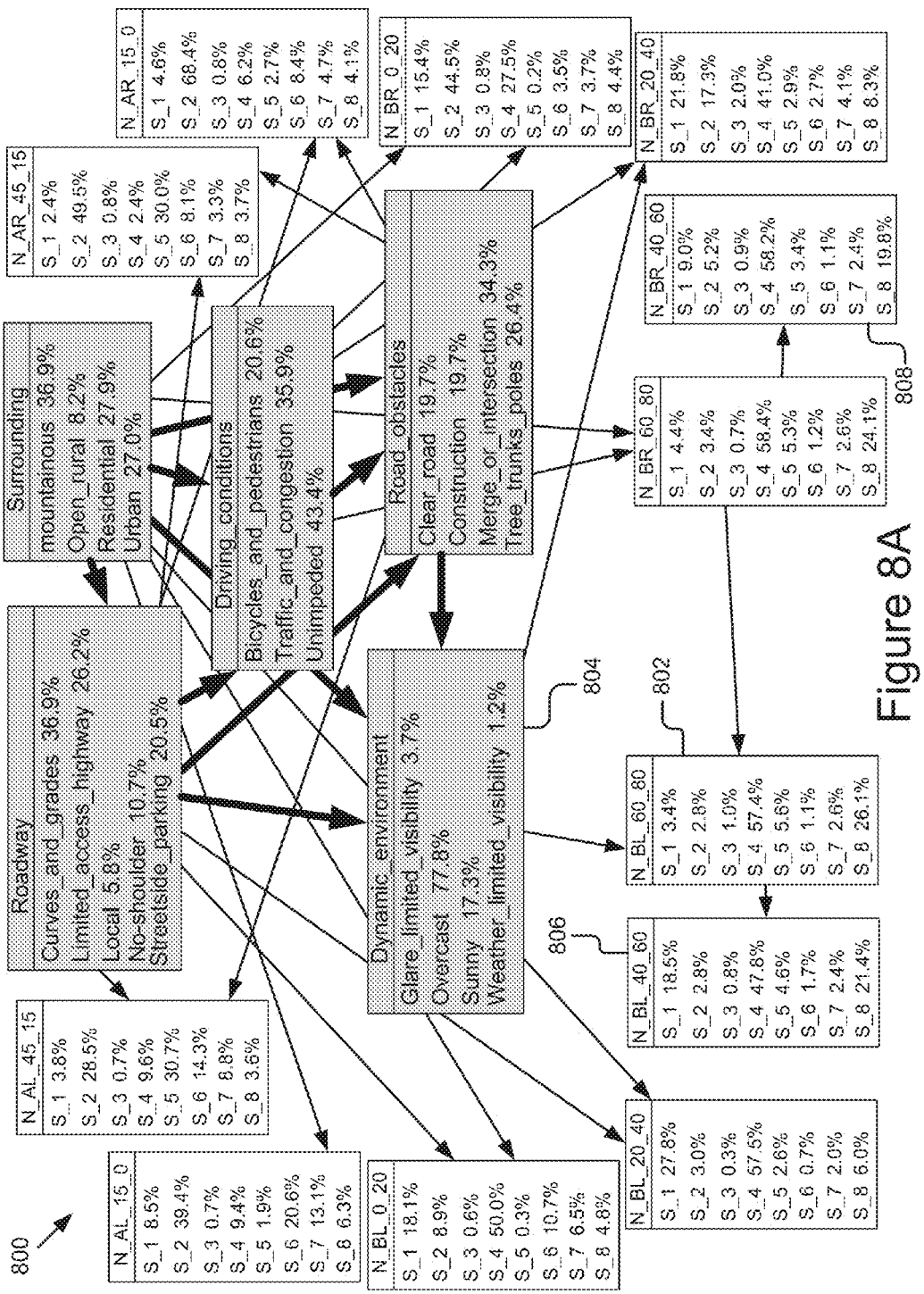
FIGS. 8A-B are graphic representations illustrating example probabilistic models.
Figure 8B:
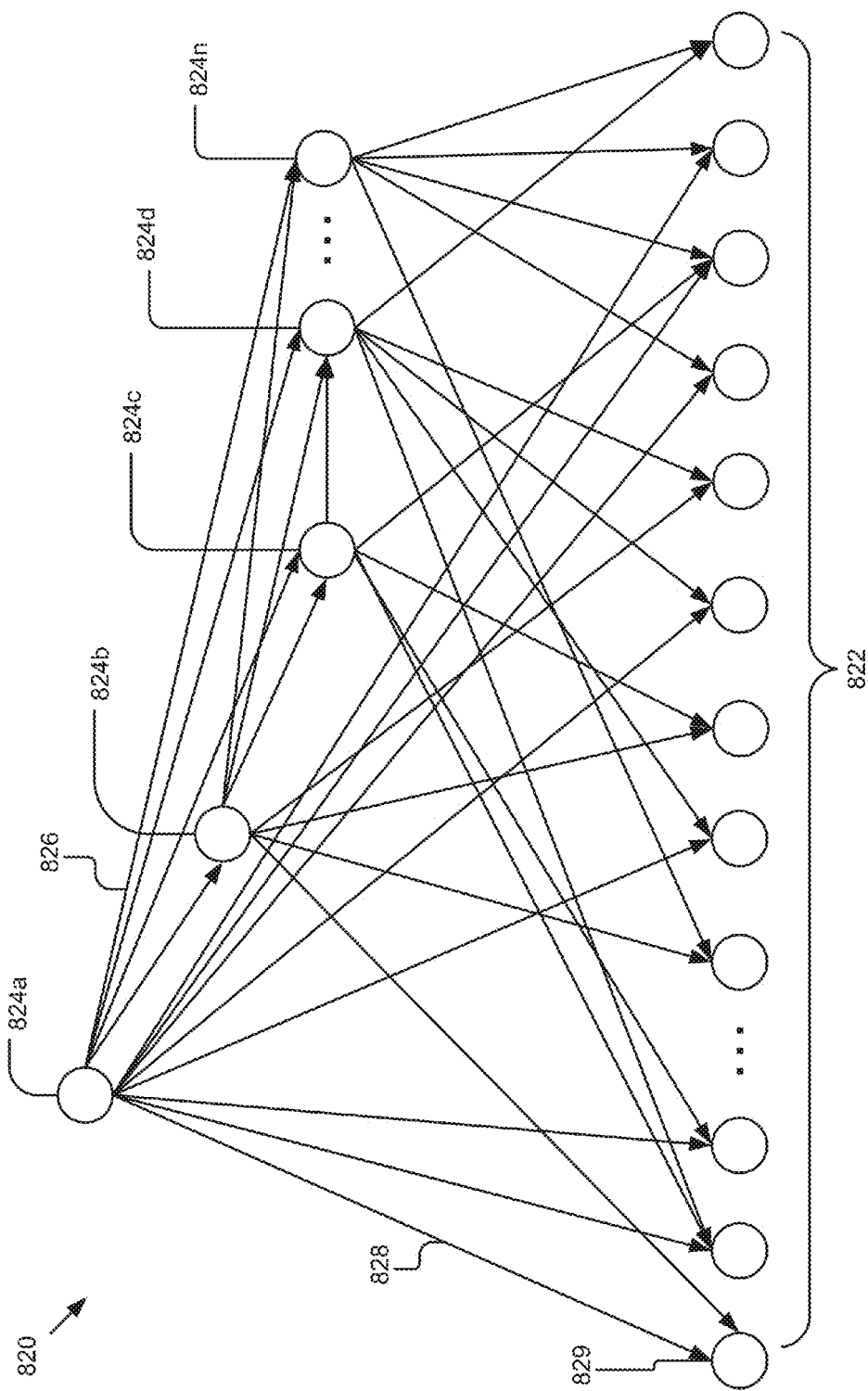

The probabilistic model such as the Bayes network can be structured into multiple levels, such as a top level and a lower level, with the top level of outputs and the lower level of inputs as illustrated in FIG. 8B. This multiple-level structure can provide the canonical structure for classification using a Bayes network. In this case, the probabilistic model may have multiple output nodes. An input node of the Bayes network may be referred to as a virtual evidence node, which can provide evidence to the Bayes network for generating an output. Each input node can correspond to one partition region of an image, and receive pixel characteristic data associated with that partition region as input data to the probabilistic model. For example, the number of input nodes in the Bayes network can be the same as the number of partition regions in the image, with one input node corresponding to one partition region.

Additional constraints can be used to limit in-degree and node ordering in the Bayes network. The in-degree of evidence nodes can be limited to two. In some embodiments, the node ordering can be imposed as a constraint on the structure, so that conditioning arcs cannot go from the lower level to the upper level. There can be additional causal constraints imposed among scene variables, for example, the "surroundings" scene variable can influence the type of roadway, but not the other way around. In another example, the "surrounding" scene variable can influence the "driving condition" variable but not the other way around. The probabilistic model consequently follows an approximately naïve Bayes structure, but with additional arcs that are a consequence of the model selection performed during learning. The arcs created during the learning process can indicate discovered dependencies among the input and output variables.

In some embodiments, the learning module 210 can use pixel characteristic data in partition regions as virtual evidence to learn the Bayes network. There can, in some cases, be at least three possible ways to approximate learning the Bayes network from samples that include virtual evidence.

The first way can be to convert into an approximate equivalent observed evidence dataset by generating multiples of each evidence row, in proportion to the likelihood fraction for each state of the virtual evidence. If there may be multiple virtual evidence nodes, then the operation to capture dependencies among virtual evidence nodes can result in a combinatorial explosion of row sets, one multiple for each combination of virtual evidence node states, with multiplicities in proportion to the likelihood of the state combination. This is equivalent in complexity to combining all virtual evidence nodes into one node for sampling.

Similarly, the learning module 210 can sample from the combination of all virtual evidence nodes and generate a sample of rows based on the items in the sample. This is like logic sampling the virtual states. Both approaches make multiple copies of a row in the learning set as a way to emulate a training weight. Alternatively, the learning module 210 can apply a weight to each row in the sampled training set, in proportion to its likelihood.

A second way includes considering a mixture, a "multinet", of learned deterministic evidence models. The models may have the same structure, so the result can be a mixture of conditional probability tables (CPTs), weighted by the likelihood. This approach may suffer a combinatorial explosion of mixture components, and might be amenable to reducing the set by sampling.

A third way includes considering the virtual evidence by a virtual node that gets added as a child to the virtual evidence node, which is then instantiated to send the equivalent likelihood vector to its parent. With many cases, there would be a set of virtual nodes added to the network for each case, again generating a possibly unmanageable method. In some embodiments, the learning module 210 can build a network with one set of nodes, do one learning step, then replace the nodes with the next set, and repeat a learning step. It should be understood that additional ways are also possible and contemplated.

A sample dataset to learn the probabilistic model described herein can be a further approximation on the first way described above, where each virtual evidence node can be sampled independently to convert the problem into an equivalent one with sampled data. Each histogram can be sampled accordingly using its distribution, to generate a set of conventional evidence samples that approximated the histogram. The result can be an expanded dataset that multiplies the number of rows by the sample size for each row in the histogram dataset. The resulting learning dataset description may include:

1) Original dataset: 122 rows of 12 region histograms of images labeled by 5 scene labels.
2) Each region histogram can be sampled 10 times, to generate 1220 rows.
3) Final dataset of 5 labels and 12 features by 1220 rows.

An example evaluation result using the learning dataset is illustrated in FIG. 7B.

The scene classification module 212 can be software including routines for classifying scenes captured in images. In some embodiments, the scene classification module 212 can be a set of instructions executable by the processor 235 to provide the structure, acts, and/or functionality described below for classifying scenes captured in images. In some embodiments, the scene classification module 212 can be stored in the memory 237 of the computing device 200 and can be accessible and executable by the processor 235. The scene classification module 212 may be adapted for cooperation and communication with the processor 235 and other components of the computing device 200.

The scene classification module 212 can receive multiple sets of pixel characteristic data associated with multiple partition regions within an image from the evidence generation module 208 and/or the storage 245. The scene classification module 212 can receive data describing a probabilistic model from the storage 245 and/or learning module 210. The scene classification module 212 can classify a scene of the image based on the multiple sets of pixel characteristic data and the probabilistic model as described below in more detail.

In some embodiments, the multiple sets of pixel characteristic data can be multiple likelihood vectors, with each likelihood vector corresponding to a partition region. The scene classification module 212 can determine a distribution associated with one or more scene variables based on the multiple likelihood vectors and the probability model. For example, the scene classification module 212 can apply the multiple likelihood vectors as input data to the probabilistic model, and generate an output of the probabilistic model that describes the distribution associated with the one or more scene variables. A distribution associated with the one or more scene variables can include a joint distribution of the one or more scene variables, a conditional distribution of the one or more scene variables, an individual distribution for each scene variable or some combination thereof. In some embodiments, the distribution of each scene variable may depend on other scene variables, just as they may depend on the pixel-type distributions. This can be due to the scene variables forming a joint distribution (e.g., a distribution over all scene variables).

A scene variable can be a variable describing a category of a scene. Example scene variables include, but are not limited to, a surrounding, a roadway type, a driving condition, a dynamic environment and a road obstacle condition, etc. Each scene variable may have a set of labels. A label of a scene variable can be a possible value for the scene variable. For example, the scene variable "roadway" may have labels "curves and grades", "limited access highway", "local", "no shoulder", or "street side parking", etc. The scene variable "surroundings" may have labels "zoning", "development", "commercial", "mountainous", "open rural", "residential", or "urban", etc. The scene variable "driving condition" may have labels "bicycle and pedestrians", "traffic and congestion", or "unimpeded", etc. The scene variable "dynamic environment" may have labels related to visibility such as illumination and weather (e.g., "glare limited visibility", "overcast", "sunny", or "weather limited visibility", etc.). The scene variable "road obstacle condition" may have labels "clear road", "construction", "merge or intersection", or "tree trunks or poles", etc.

The scene classification module 212 can determine a classification of the scene in the image based on the distribution associated with the one or more scene variables. For example, the scene classification module 212 can assign one label from each scene variable to the image based on the distribution associated with the one or more scene variables. In a further example, assume the distribution associated with the scene variables can be a joint probability distribution of the scene variables, where the joint probability distribution has a highly probable value when: (1) the scene variable "roadway" equals to a first label "curves and grades;" (2) the scene variable "surrounding" equals to a second label "mountainous;" (3) the scene variable "driving condition" equals to a third label "unimpeded;" (4) the scene variable "dynamic environment" equals to a fourth label "overcast;" and (5) the scene variable "road obstacle" equals to a fifth label "merge or intersection." As a result, the scene classification module 212 can assign the first, second, third, fourth and fifth labels to the image, and the classified scene of the image can be described by the first, second, third, fourth and fifth labels.

In another example, assume the distribution associated with the scene variables includes an individual probability distribution for each scene variable, where (1) the individual probability distribution of the scene variable "roadway" has a highly probable value when the scene variable "roadway" equals to a first label "curves and grades;" (2) the individual probability distribution of the scene variable "surrounding" has a highly probable value when the scene variable "surrounding" equals to a second label "mountainous;" (3) the individual probability distribution of the scene variable "driving condition" has a highly probable value when the scene variable "driving condition" equals to a third label "unimpeded;" (4) the individual probability distribution of the scene variable "dynamic environment" has a highly probable value when the scene variable "dynamic environment" equals to a fourth label "overcast;" and (5) the individual probability distribution of the scene variable "road obstacle" has a highly probable value when the scene variable "road obstacle" equals to a fifth label "merge or intersection." As a result, the scene classification module 212 can assign the first, second, third, fourth and fifth labels to the image, and the classified scene of the image can be described by the first, second, third, fourth and fifth labels.

In a further example, the scene classifier can be a probabilistic model with virtual evidence nodes corresponding to the M regions of the image. Each evidence node can receive pixel characteristic data (e.g., virtual evidence) in the form of a lambda message, $\lambda_m$, with state likelihoods in the ratios given by $H_m$. The probabilistic model may have a subset of nodes $S=\{S_1, \ldots S_v\}$, which represents a set of scene variable nodes with each scene variable node having a discrete state space (e.g., each scene variable having a discrete set of labels). The scene classification can be described by: (1) $P(S|\lambda_1, \ldots, \lambda_m)$, the joint distribution of S when the $\lambda_m$ messages from the M partition regions are applied; (2) a characterization of the joint distribution by the maximum a posteriori (MAP) configuration over S; or (3) the posterior marginal distributions of S.

In some embodiments, the scene classification module 212 can classify the scene of the image holistically. For example, the scene classification module 212 can determine an overall impression of the entire content depicted by the image and use the overall impression to categorize the image into one or more labels of scene categories. This holistic classification of the scene described herein is different from other classifications that only apply to parts of the scene or depend on identifying contents making up parts of the scene such as identifying objects in part of the scene.

In some embodiments, the scene classification module 212 can evaluate the performance of the scene classification. For example, tests on a provisional dataset show good classification accuracy (higher than 70% accuracy) among classifications of the scene variables. An example evaluation result is illustrated with reference to FIG. 7B.

The scene utilization application 117 can be software including routines for utilizing scenes of images in various applications for advising and/or assisting users. For instance, the scene utilization application 117 may be an "app" downloaded from an application marketplace onto a client device 115 or the moving platform 135, may be an in-vehicle infomatics software system; may be a native application operating on a client device 115, etc.; may be a web-based application accessible via a browser; etc. The scene utilization application 117 may include and/or embody various different applications including navigation, mapping, social network, communication, recommendation, media, etc., application's. In some embodiments, the scene utilization application 117 can be a set of instructions executable by the processor 235 to provide the structure, acts, and/or functionality described below for utilizing scenes of images in various applications for advising and/or assisting users. In some embodiments, the scene utilization application 117 can be stored in the memory 237 of the computing device 200 and can be accessible and executable by the processor 235. The scene utilization application 117 may be adapted for cooperation and communication with the processor 235 and other components of the computing device 200.

In some embodiments, the scene utilization application 117 can receive a classified scene for an image from the scene classification module 212 and/or the storage 245, and generate graphical data for providing a user interface that presents a scene classification result to a user. The scene classification result can describe the classified scene of the image. The scene utilization application 117 can send the graphical data to a client device 115 and/or a moving platform 135, causing the client device 115 and/or the moving platform 135 to present the user interface to the user. The scene utilization application 117 may generate graphical data for providing other user interfaces to users.

One example purpose of scene classification includes capturing the gist of the current view from the assigned labels of scene variables. For example, the scene classification may provide answers to a question such as "how would you describe a place from what you see?" In some embodiments, the scene utilization application 117 can provide scene specific recommendations to users. For example, a classified scene can provide context in an environment, and the scene utilization application 117 can use the classified scene to determine the appropriate recommendation for the user. For example, in making a personalized recommendation, the context in the classified scene can be used to determine the practicality of the request, such as "Do you want to get burrito now?"; "This isn't the kind of neighborhood where you can find that", etc.

In some embodiments, the scene utilization application 117 can provide scene-enhanced search to users. For example, the scene utilization application 117 can supplement a search using characteristics of the local surroundings, such as "Find me a winery in a built-up area"; "Find me a restaurant in a remote place"; "Find a park in an uncongested, less-traveled residential area"; etc.

In some embodiments, the scene utilization application 117 can determine a desirability score for a current environment. Drivers often factor in the pleasantness of a route in their choice of routes. For example, a driver may consider, "How is the view from this place?"; "How shaded or sunny is the area?"; "What fraction of the surroundings are natural versus artificial?"; etc. Given an individual driver's ratings of preferred locations, the scene utilization application 117 may suggest other desirable routes to the driver, where the desirable routes may possibly be out of the way when compared to a shortest or quickest route.

In some embodiments, the scene utilization application 117 can provide a crowd-sourced aggregation of scene characteristics to users. The scene utilization application 117 can aggregate crowd-sourced findings about nearby locations from distributed systems to form a comprehensive picture of an area. This example use is an extension of the example uses discussed above. Using the crowd-sourced data, a driver can gain the benefit of an aggregated picture from other vehicles in the vicinity, such as answering the question: "How far ahead does this swarm of people on the road (a road-race, or parade, for example) extend?"

The scene classification technology described herein differs from object recognition techniques in numerous respects. The scene classification described herein includes a holistic image-level inference task while the object recognition techniques include a task of recovering the identity, presence, and pose of objects within an image. The object recognition techniques focus on distinguishing the object from background of the rest of the image. Comparing to object recognition, the scene classification technology can achieve a computational economy by treating the image as a whole. For example, the scene classification technology can assign the image to a class of "indoor", "outdoor", "urban landscape", or "rural landscape", etc., from a set of pre-defined categories. The scene classification can be viewed as assigning a posterior to labels of the categories, where the image may be assigned with a value over multiple sets of labels and the posterior can be a joint distribution over several scene variables.

Methods

Figure 3:
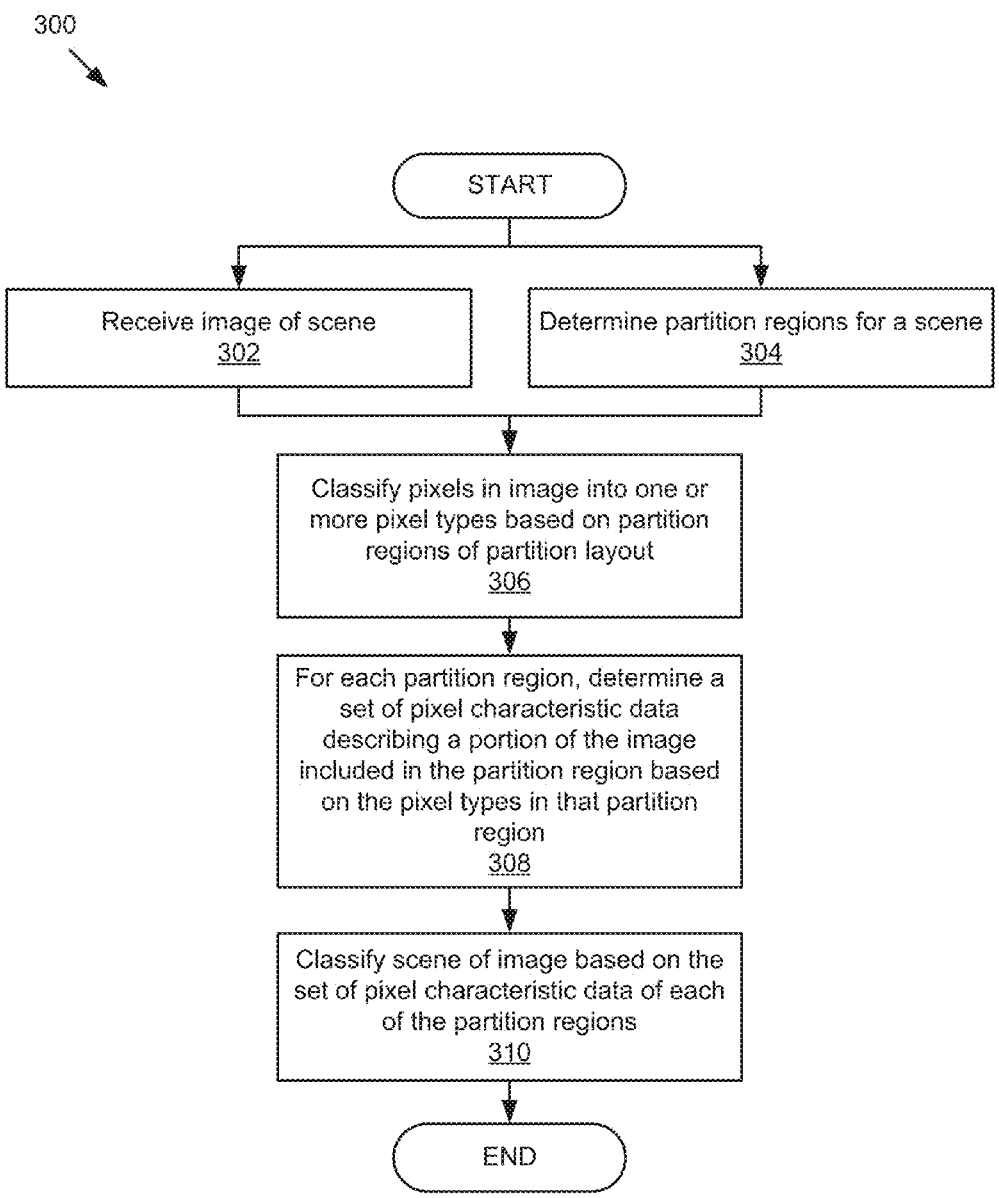
FIG. 3 is a flowchart of an example method for inferring scenes from images.

FIG. 3 is a flowchart of an example method 300 for inferring scenes from images. The partition module 204 can determine 304 partition regions for a scene. The geometry of the partition regions may be determined based on one or more contextual attributes. The partition regions may form a partition layout and may correspond to different aspects of the scene. The pixel classification module 206 can receive 302 data describing an image from the camera 107, the storage 245, the image processor 202, or another component of the system 100. The image may depict the scene and may be received after, during, or prior to the determination of the partition regions for the scene.

The pixel classification module 206 can classify 306 pixels in each partition region to one or more pixel types. For example, the pixel classification module 206 may apply (e.g., align) the partition regions to the image, determine which pixels are bounded by each partition region, and can classify the pixels in each partition region of the image to one or more pixel types. In a further example, the pixel classification module 206 can classify each pixel in each partition region to one pixel type from a set of 8 predetermined pixel types.

For each partition region, the evidence generation module 208 can determine 308 a set of pixel characteristic data describing a portion of the image included in the partition region based on the pixel types of the pixels in that partition region. The scene classification module 212 can classify 310 a scene of the image based on the set of pixel characteristic data of each of the partition regions. For example, the scene classification module 212 can use multiple sets of pixel characteristic data associated with multiple partition regions as input data to a probabilistic model, and classify the scene of the image based on an output of the probabilistic model.

Figure 4A:
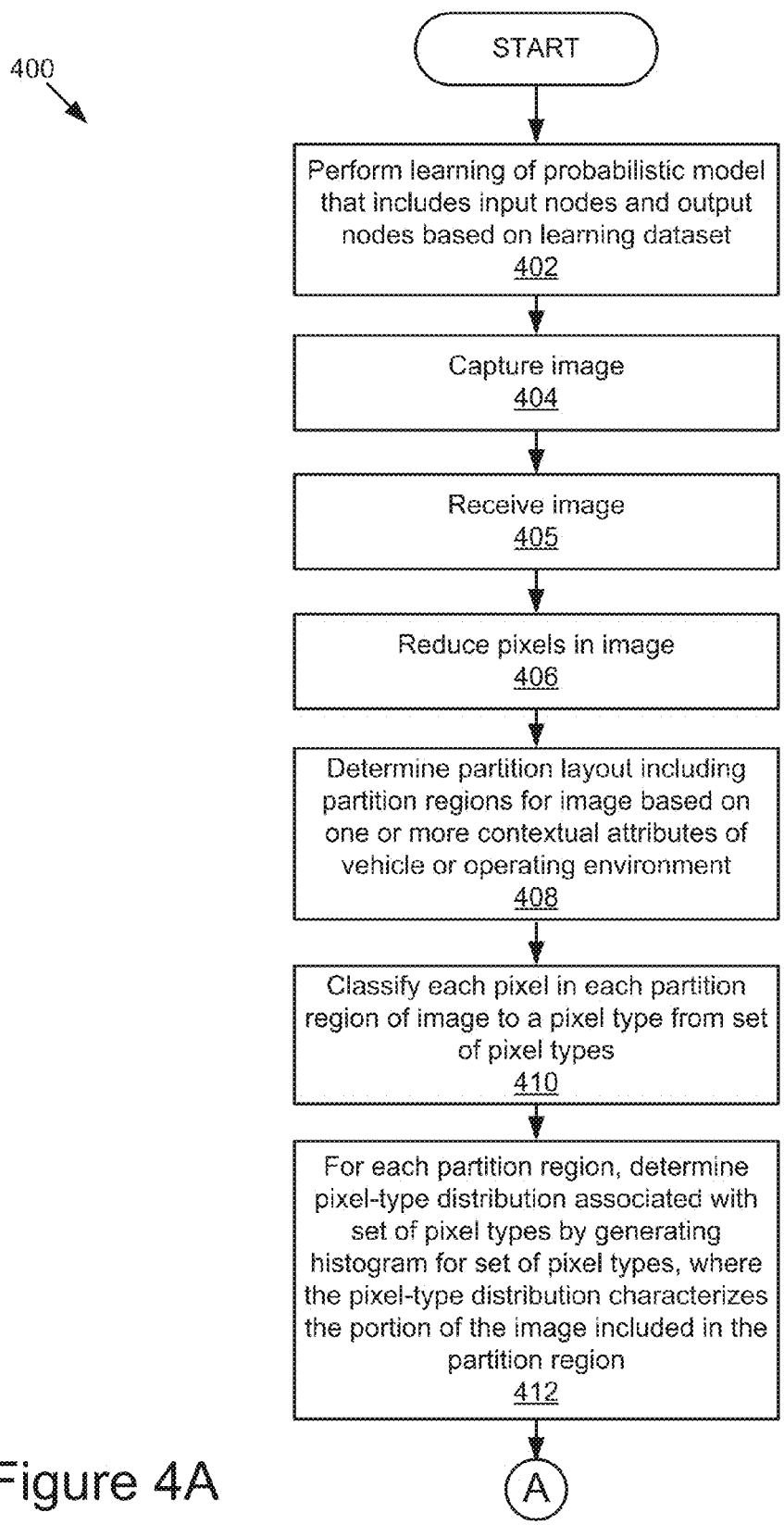
FIGS. 4A and 4B are flowcharts of a further example method for inferring scenes from images.
Figure 4B:
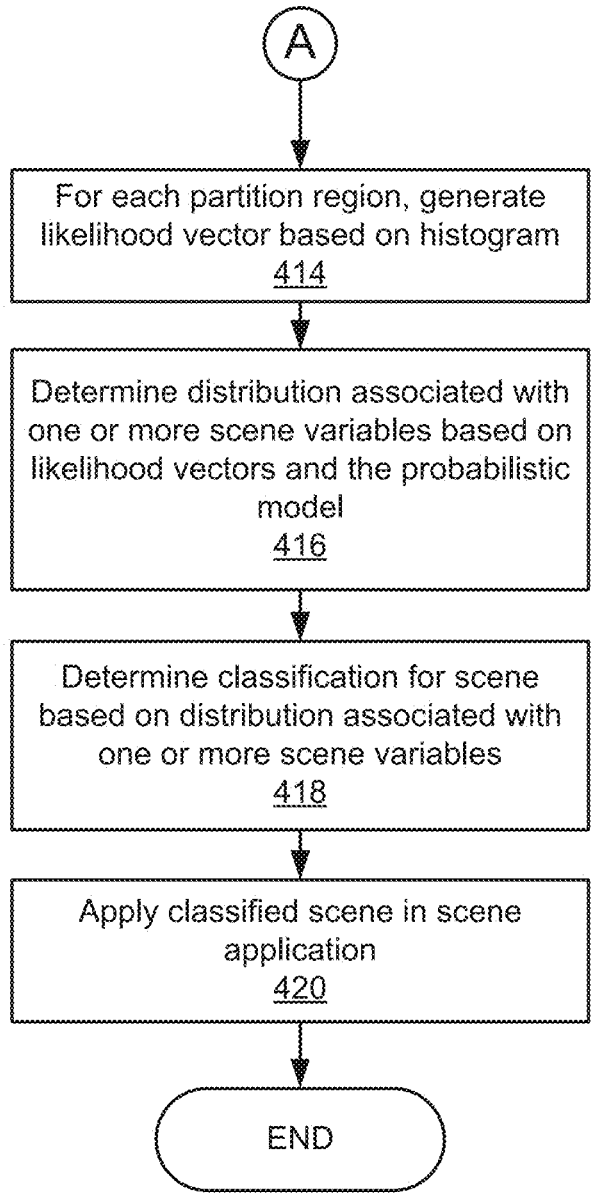

FIGS. 4A and 4B are flowcharts of another example method 400 for inferring scenes from images. Referring to FIG. 4A, the learning module 210 can perform 402 a learning of a probabilistic model that includes input nodes and output nodes based on the learning dataset. The input nodes can be virtual evidence nodes that input pixel characteristic data to the probabilistic model. The output nodes can be scene variable nodes that output a distribution associated with the scene variables. The camera 107 can capture 404 an image (e.g., a video frame, still image, etc.) depicting an environment surrounding the moving platform 135 (e.g., a scene). The image processor 202 can receive 405 data describing the image from the camera 107, the storage 245, and/or another component of the system 100. The image processor 202 can reduce 406 pixels in the image before processing the image. For example, the image processor 202 can down-sample the image to generate a down-sampled image. The partition module 204 can determine 408 a partition layout for the image based on one or more contextual attributes of the moving platform 135 (e.g., vehicle) and/or the operating environment of the moving platform 135. The pixel classification module 206 can classify 410 each pixel in each partition region of the image to a pixel type from a set of pixel types.

For each partition region, the evidence generation module 208 can determine 412 a pixel-type distribution associated with the set of pixel types by generating a histogram for the set of pixel types, where the pixel-type distribution can characterize the portion of the image included in (e.g., bounded by) the partition region.

Referring to FIG. 4B, for each partition region, the evidence generation module 208 can generate 414 a likelihood vector based on the histogram. The scene classification module 212 can determine 416 a distribution associated with one or more scene variables based on the likelihood vectors associated with the partition regions and the probabilistic model. The scene classification module 212 can determine 418 a classification of the scene in the image based on the distribution associated with the one or more scene variables. The scene utilization application 117 can apply 420 the classified scene in various scene applications. The block 420 is described below in more detail with reference to at least FIG. 5.

Figure 5:
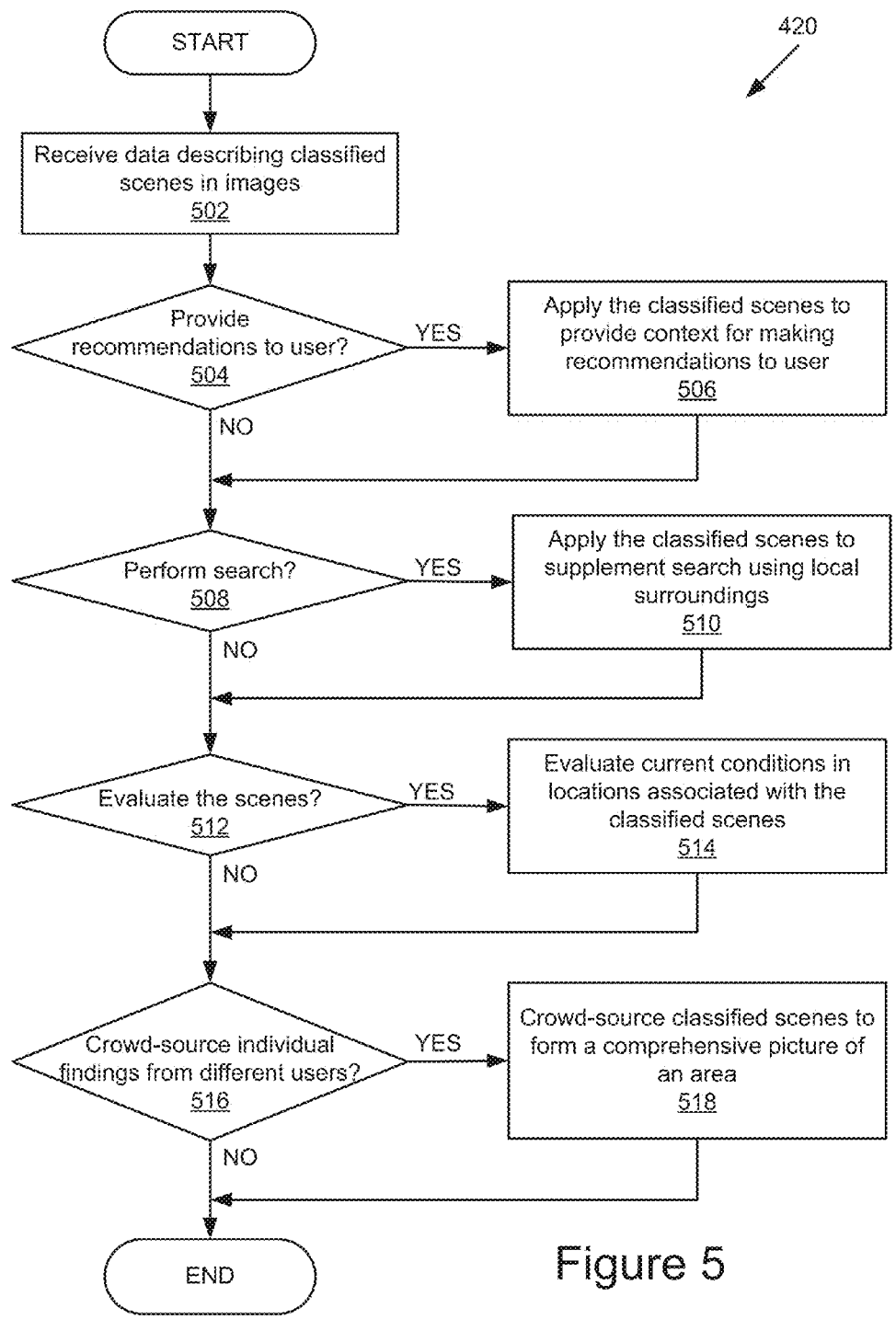
FIG. 5 is a flowchart of an example method for utilizing classified scenes in various applications.

FIG. 5 is a flowchart of an example method 420 for utilizing classified scenes in various applications. The scene utilization application 117 can receive 502 data describing classified scenes in images from the storage 245 and/or scene classification module 212. The scene utilization application 117 can determine 504 whether to provide recommendations to a user. If the scene utilization application 117 determines to provide recommendations to the user, the method 420 can move to block 506. Otherwise, the method 420 can move to block 508. At block 506, the scene utilization application 117 can apply 506 the classified scenes to provide context for making recommendations to the user and the method 420 can move to block 508.

At block 508, the scene utilization application 117 can determine whether to perform a search for the user. If the scene utilization application 117 determines to perform a search for the user, the method 420 can move to block 510. Otherwise, the method 420 can move to block 512. At block 510, the scene utilization application 117 can apply the classified scenes to supplement the search using local surroundings in the classified scenes and the method 420 can move to block 512.

At block 512, the scene utilization application 117 can determine whether to evaluate the scenes. If the scene utilization application 117 determines to evaluate the scenes, the method 420 can move to block 514. Otherwise, the method 420 can move to block 516. At block 514, the scene utilization application 117 can evaluate current conditions at locations associated with the classified scenes and the method 420 can move to block 516. For example, the scene utilization application 117 can evaluate the pleasantness of the environments in the scenes.

At block 516, the scene utilization application 117 can determine whether to crowd-source individual findings from different users. If the scene utilization application 117 determines to crowd-source individual findings, the method 420 can move to block 518. Otherwise, the method 420 can end or repeat operations described above. At block 518, the scene utilization application 117 can crowd-source classified scenes to form a comprehensive picture of an area, and the method 420 can end or repeat operations described above.

Graphic Representations

FIG. 6J is a graphic representation 600 illustrating an example of a pixel-level classification for an example image. In this example, Pixels 1 and 2 in the image can be classified to a pixel type of sky; Pixels 3 and 5 can be classified to a pixel type of foliage; and Pixels 4 and 6 can be classified to a pixel type of building. FIG. 6K is a graphic representation of an example partition layout 655. As depicted, the partition layout may include 12 partitions that converge at a central point 656. Each of the 12 partitions extends outwardly from the partition central point 656 to an edge corresponding to an edge of the image. The pixel numbering from 1-6 in FIGS. 6J and 6K may correspond in some examples.

FIG. 8B is a graphic representation 820 illustrating an example probabilistic model. The example probabilistic model includes a plurality of input nodes 822 and a plurality of output nodes 824a, 824b, 824c, and 824d . . . 824n. Each input node 822 can correspond to a partition region in the image, and use a set of pixel characteristic data associated with that partition region as input data to the probabilistic model. Each output node 824 can represent a scene variable, and the probabilistic model can output one or more distributions associated with the scene variables. The one or more distributions can include a joint distribution of the scene variables, an individual distribution of each scene variable, a conditional distribution of the scene variables or some combination thereof. A line or an arc connecting two nodes (e.g., a line 826 connecting the node 824a and the node 824n, or a line 828 connecting the node 824a and the node 829) can indicate a dependency or relevance between the two nodes. The structure of the probabilistic model is illustrated by way of example. In additional embodiments, the probabilistic model may have different input nodes, different output nodes, and different connecting lines between the nodes.

Figure 7A:
FIG. 7A is a graphic representation illustrating an example confusion matrix.

FIG. 7A is a graphic representation 700 illustrating an example confusion matrix. During the learning process of the probabilistic model, the scene classification module 212 can generate a confusion matrix for each scene variable and use the confusion matrices for all the scene variables to evaluate the performance of the scene classification. As illustrated in FIG. 7A, a confusion matrix associated with a scene variable can be a matrix of counts of the true labels 704 by the predicted labels 702. The rows in the confusion matrix can be represented by the true labels 704 and the columns of the confusion matrix can be represented by the predicted labels 702. A predicted label can be a label estimated for an image. A true label can be an actual label for an image. If the predicted label is the same as the true label, the classification of the image regarding the scene variable is correct. Otherwise, the classification of the image regarding the scene variable is incorrect. For example, if the predicted label for the scene variable "roadway" is the same as the true label "curves and grades", the classification of the image with the predicted label "curves and grades" is correct. If the predicted label for the scene variable "roadway" is "local" which is different from the true label "curves and grades", the classification of the image with the predicted label "local" is incorrect.

The diagonal elements in the confusion matrix can represent the true counts of the respective labels. For example, the first diagonal element with a value of "50" indicates that there are 50 times that the scene classification module 212 estimates the predicted label to be label 1, where label 1 is actually the true label. The off-diagonal elements indicate classification errors. For example, the off-diagonal element with a value of "2" indicates that the scene classification module 212 estimates the predicted label as label 2 twice while the true label is label 1; and the off-diagonal element with a value of "4" indicates that the scene classification module 212 estimates the predicted label as label 1 four times while the true label is label 2.

The sum of each column can represent the total counts that the column's corresponding label is predicted as the label for the images. For example, the sum of the column 708 represents the total counts (59=50+4+5) that the predicted label for the 59 images is estimated as label 1, even though the true labels for 50 images are label 1, the true labels for 4 images are label 2, and the true labels for 5 images are label 3. The sum of each row can represent the total counts that the true label for the images is actually the row's label. For example, the sum of the row 706 represents the total counts (55=50+ 2+3) that the true label for the 55 images is actually label 1, even though the predicted labels for 50 images are estimated as label 1, the predicted labels for 2 images are estimated as label 2 and the predicted labels for 3 images are estimated as label 3.

A recall or coverage for a label can represent a ratio between correct classification cases of the label and all the classification cases of the label. The recall for a label can be calculated as a ratio of: (1) the diagonal element associated with the label; and (2) a sum of the row associated with the label. For example, the recall for label 1 can be computed as a ratio between the diagonal entry "50" associated with label 1 and the sum of the row 706 (e.g., $$\left(\text{e.g., } \frac{50}{50+2+3} = 0.91\right).$$

A higher value for the recall of the label indicates the classification of the label is more accurate.

A precision for a label can be calculated as a ratio of: (1) the diagonal element associated with the label; and (2) a sum of the column associated with the label. For example, the precision for label 1 can be computed as a ratio between the diagonal element "50" associated with label 1 and the sum of the column 708 (e.g., $$\left(\text{e.g., } \frac{50}{50+4+5} = 0.85\right).$$

A higher value for the precision of the label indicates the classification of the label is more accurate.

FIG. 7B is a graphic representation 750 illustrating an example evaluation result for scene classification. Table 1 illustrates recalls and precisions for different labels (such as mountainous, open rural, residential, and urban) associated with the scene variable "surroundings". Table 2 illustrates recalls and precisions for different labels (such as curves and grades, limited access highway, local, no shoulder, street side parking) associated with the scene variable "roadways". Table 3 illustrates recalls and precisions for different labels (such as bicycles and pedestrians, traffic and congestion, unimpeded) associated with the scene variable "driving conditions". Table 4 illustrates recalls and precisions for different labels (such as clear road, construction, merge intersection, tree trunks and poles) associated with the scene variable "road obstacles".

A comparison between Table 1 and Table 4 indicates that on average the precisions and recalls for labels of the scene variable "surroundings" outperform the precisions and recalls for labels of the scene variable "road obstacles". This is because the classification of the scene variable "surroundings" may take the entire image into consideration while the classification of the scene variable "road obstacles" merely considers details in the driving lane. In Table 3, the recall for the label "bicycles and pedestrians" is low because the bicycles and pedestrians merely appear in small areas of the images. In addition to evaluating accuracy of marginal predictions, the scene classification module 212 can also make observations about the structure learned for the Bayes network, which is depicted in FIG. 8A.

FIG. 8A is a graphic representation 800 illustrating a probabilistic model such as a Bayes network. In this example, each block such as blocks 802, 806 or 808 with symbols "S_1", "S_2", "S_3", "S_4", "S_5", "S_6", "S_7", and "S_8" represents an input node for the probabilistic mode, and includes pixel characteristic data (e.g., virtual evidence) associated with one partition region. The input nodes are arranged roughly in the positions of the corresponding partition regions in the image. The symbols "S_1", "S_2", "S_3", "S_4", "S_5", "S_6", "S_7", and "S_8" represent different pixel types such as tree, building, sky, foliage, building-structure, road-surface, lane, barrier-sidewalk, vehicle, and pedestrian. Each block includes a value describing a percentage of each pixel type in the respective partition region. For example, in block 802, the pixel type "S_1" has a value of 3.4%, and the pixel type "S_2" has a value of 2.8%. The numeric values in the title of each block represent angles of the partition lines in view of the central point. For example, "N_BL_60_80" represents a partition region between 60 degrees and 80 degrees on the left, and "N_BR_60_80" represents a partition region between 60 degrees and 80 degrees on the right.

Each block with gray fill (such as block 804) can be an output node of the probabilistic model, which can represent a scene variable such as "roadway", "surrounding", "driving conditions", "dynamic environment", or "road obstacles." Each scene variable can have a set of labels and values for the labels. For example, the scene variable "dynamic environment" in block 804 has labels "glare limited visibility" with a probability of 3.7%, "overcast" with a probability of 77.8%, "sunny" with a probability of 17.3% and "weather limited visibility" with a probability of 1.2%.

Arcs or connecting lines in the probabilistic model indicate which input nodes are relevant to which scene variables. These arcs are relatively sparse, in part because the in-degree of evidence nodes is limited to two. The arcs chosen by the learning module 210 show a strong association between the location of the partition regions, and different scene variables. For example, strong associations are shown where the "driving conditions" scene variable connects to partition regions at the base of the image, and the "surroundings" scene variable connects to partition regions on the image periphery. The relevance of the two partition regions at the bottom of the diagram (e.g., blocks 806, 808) is limited, since their incoming arcs are only from other partition regions, indicating that their evidence is supported entirely by neighboring regions. Further along these arcs or lines, in terms of partition dependencies, only one arc is learned between partition regions, indicating that the evidence contributed to the scene is conditionally independent in all but this case. The sub-network of scene variables is more connected, indicating strong dependencies among the scene variables. For example, "curves and grades" in roadway correlates strongly with "mountainous" surroundings.

Figure 9:
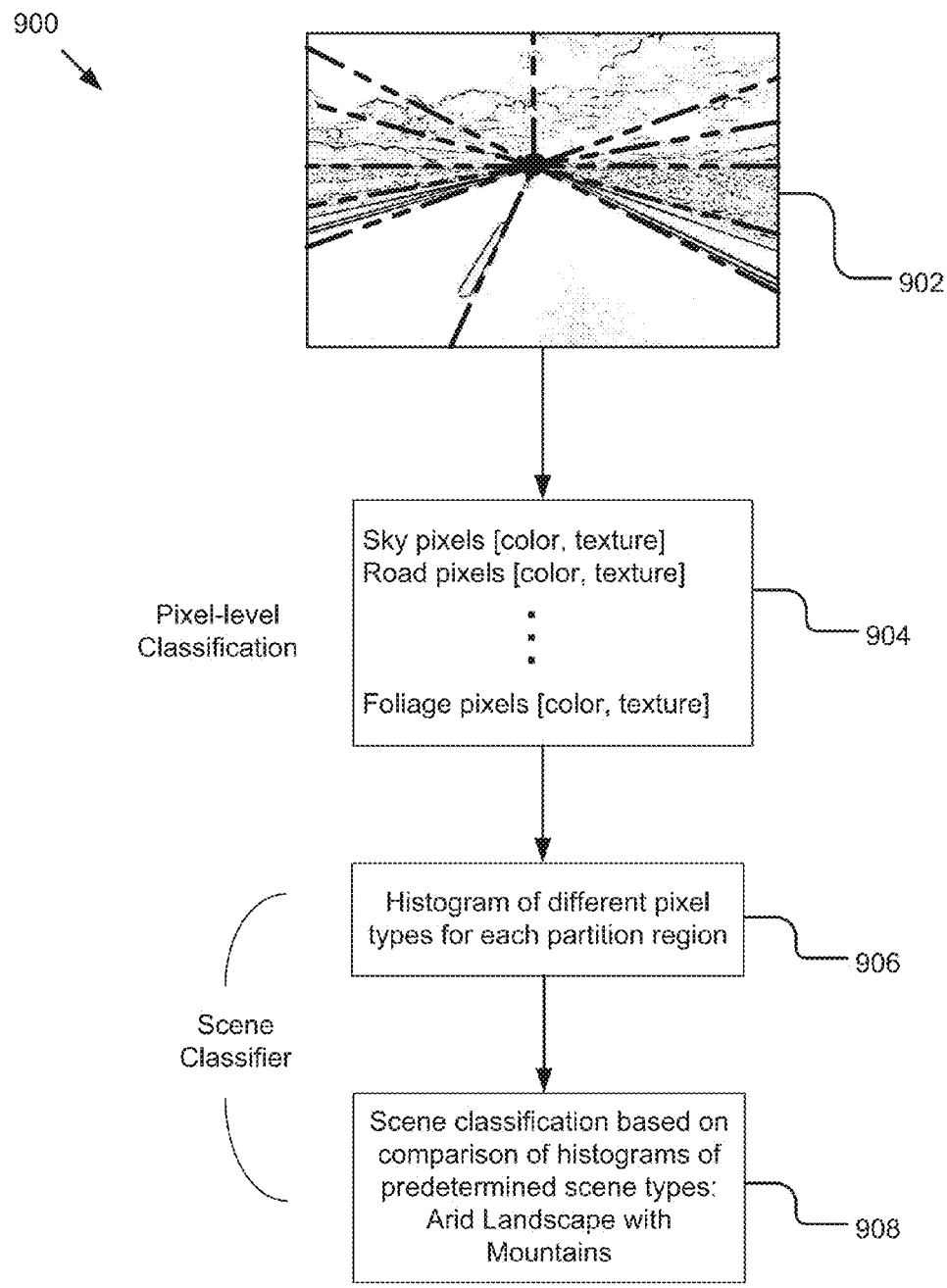
FIG. 9 is a graphic representation illustrating an example process to infer a scene from an image.

FIG. 9 is a graphic representation 900 illustrating an example process to infer a scene from an image. Not knowing what scene will be depicted by an image, the partition module 204 can determine a partition layout 902 formed of partition regions for the image based on one or more contextual attributes (e.g., of the vehicle, the operating environment of the vehicle, etc.). The pixel classification module 206 can apply the partition regions to the image and classify the pixels in each partition region to one or more pixel types as illustrated in block 904. The evidence generation module 208 can generate a histogram of different pixel types for each partition region as shown in block 906. The scene classification module 212 can perform scene classification based on the histogram of each partition region as shown in block 908. For example, the scene classification module 212 can perform scene classification based on a comparison of histograms of predetermined scene types, and determine the scene as arid landscape with mountains.

FIG. 10 is a graphic representation 1000 illustrating another example of pixel level classification. The image processor 202 can down sample the original image 1002 to an image of 96 pixels by 54 pixels. The barriers 1006a, 1006b bordering the lane in the image 1002 are important features that the system can be trained to recognize. The image 1004 shows pixel types associated with the down-sampled image. Rays emanating from the image center of the image 1004 illustrate wedge-shaped partition regions applied to the image. Colors in the image 1004 can indicate the pixel types. For example, green color 1008 may indicate foliage and beige color 1010a, 1010b may indicate barriers.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining a partition layout of partition regions that corresponds to a scene depicted by an image captured by a camera of a moving platform;
   receiving one or more contextual attributes describing a motion of the moving platform;
   dynamically reshaping the partition layout of the partition regions by adjusting a location of a central point based at least on the motion of the moving platform;
   classifying pixels forming the image into one or more pixel types based on one or more pixel-level features;
   determining, for each partition region, a set of pixel characteristic data describing a portion of the image included in the partition region based on the one or more pixel types of pixels in the partition region; and
   classifying the scene of the image based on the set of pixel characteristic data of each of the partition regions.

2. The method of claim 1, wherein classifying the scene includes determining an overall impression of content depicted by the image and using the overall impression to categorize the image into one or more scene categories.

3. The method of claim 1, wherein at least two or more of the partition regions, when applied to the image, converge at the central point within an area of the image.

4. The method of claim 3, wherein the number of partition regions is five or more.

5. The method of claim 1, wherein the central point is a reference point that sets an expectation that determines one or more aspects used during classification of the scene, and a geometry of each of the partition regions is determined based on the central point.

6. The method of claim 1, wherein a geometry of the partition regions is dynamically determined based on the one or more contextual attributes that are independent of image data forming the image.

7. The method of claim 1, wherein a geometry of each of the partition regions is dynamically determined by adjusting the location of the central point from which the partition regions emanate based on at least on the motion of the moving platform.

8. The method of claim 1, wherein the central point is predictive of an epipole.

9. The method of claim 1, wherein each of the partition regions extends outwardly from the central point to an edge corresponding to an edge of the image.

10. The method of claim 1, further comprising:
    capturing image data forming the image from the moving platform traveling on a roadway, wherein the image depicts the scene including the roadway.

11. The method of claim 1, wherein determining the set of pixel characteristic data for each partition region comprises:
    determining a pixel-type distribution within each partition region; and
    generating the set of pixel characteristic data for each partition region based on the pixel-type distribution.

12. The method of claim 11, wherein the pixel-type distribution within each partition region is based on a histogram of the one or more pixel types within each partition region.

13. The method of claim 1, wherein classifying the scene of the image comprises:
    determining a distribution associated with one or more scene variables based on the set of pixel characteristic data of each of the partition regions; and
    determining a classification for the scene based on the distribution associated with the one or more scene variables.

14. A computer program product comprising a non-transitory computer-readable medium including a computer readable program, wherein the computer readable program when executed on a computer causes the computer to:
    determine a partition layout of partition regions that corresponds to a scene depicted by an image captured by a camera of a moving platform;
    receive one or more contextual attributes describing a motion of the moving platform;
    dynamically reshape the partition layout of the partition regions by adjusting a location of a central point based at least on the motion of the moving platform;
    classify pixels forming the image into one or more pixel types based on one or more pixel-level features;
    determine, for each partition region, a set of pixel characteristic data describing a portion of the image included in the partition region based on the one or more pixel types of pixels in the partition region; and
    classify a scene of the image based on the set of pixel characteristic data of each of the partition regions.

15. The computer program product of claim 14, wherein to classify the scene includes determining an overall impression of content depicted by the image and using the overall impression to categorize the image into one or more scene categories.

16. The computer program product of claim 14, wherein at least two or more of the partition regions, when applied to the image, converge at the central point within an area of the image.

17. The computer program product of claim 16, wherein the number of partition regions is five or more.

18. The computer program product of claim 14, wherein the central point is a reference point that sets an expectation that determines one or more aspects used during classification of the scene, and a geometry of each of the partition regions is determined based on the central point.

19. The computer program product of claim 14, wherein a geometry of the partition regions is dynamically determined based on the one or more contextual attributes that are independent of image data forming the image.

20. The computer program product of claim 14, wherein a geometry of each of the partition regions is dynamically determined by adjusting the location of the central point from which the partition regions emanate based on the motion of the moving platform.

21. The computer program product of claim 14, wherein the central point is predictive of an epipole.

22. The computer program product of claim 14, wherein each of the partition regions extends outwardly from the central point to an edge corresponding to an edge of the image.

23. The computer program product of claim 14, wherein the computer readable program when executed on the computer causes the computer to:
  capture image data forming the image from the moving platform traveling on a roadway, wherein the image depicts the scene including the roadway.

24. The computer program product of claim 14, wherein determining the set of pixel characteristic data for each partition region comprises:
  determining a pixel-type distribution within each partition region; and
  generating the set of pixel characteristic data for each partition region based on the pixel-type distribution.

25. The computer program product of claim 24, wherein the pixel-type distribution within each partition region is based on a histogram of the one or more pixel types within each partition region.

26. The computer program product of claim 14, wherein to classify the scene of the image comprises:
  determining a distribution associated with one or more scene variables based on the set of pixel characteristic data of each of the partition regions; and
  determining a classification for the scene based on the distribution associated with the one or more scene variables.

27. A system comprising:
  a processor; and
  a memory storing instructions that, when executed, cause the system to:
    determine a partition layout of partition regions that corresponds to a scene depicted by an image captured by a camera of a moving platform;
    receive one or more contextual attributes describing a motion of the moving platform;
    dynamically reshape the partition layout of the partition regions by adjusting a location of a central point based at least on the motion of the moving platform;
    classify pixels forming the image into one or more pixel types based on one or more pixel-level features;
    determine, for each partition region, a set of pixel characteristic data describing a portion of the image included in the partition region based on the one or more pixel types of pixels in the partition region; and
    classify a scene of the image based on the set of pixel characteristic data of each of the partition regions.

28. The system of claim 27, wherein the instructions cause the system to classify the scene by:
  determining an overall impression of content depicted by the image and using the overall impression to categorize the image into one or more scene categories.

29. The system of claim 27, wherein at least two or more of the partition regions converge, when applied to the image, at the central point within an area of the image.

30. The system of claim 29, wherein the number of partition regions is five or more.

31. The system of claim 27, wherein the central point is a reference point that sets an expectation that determines one or more aspects used during classification of the scene, and a geometry of each of the partition regions is determined based on the central point.

32. The system of claim 27, wherein a geometry of the partition regions is dynamically determined based on the one or more contextual attributes that are independent of image data forming the image.

33. The system of claim 27, wherein a geometry of each of the partition regions is dynamically determined by adjusting the location of the central point from which the partition regions emanate based on the motion of the moving platform.

34. The system of claim 27, wherein the central point is predictive of an epipole.

35. The system of claim 27, wherein each of the partition regions extends outwardly from the central point to an edge corresponding to an edge of the image.

36. The system of claim 27, wherein the instructions when executed cause the system to:
  capture image data forming the image from the moving platform traveling on a roadway, wherein the image depicts the scene including the roadway.

37. The system of claim 27, wherein the instructions when executed cause the system to determine the set of pixel characteristic data for each partition region by:
  determining a pixel-type distribution within each partition region; and
  generating the set of pixel characteristic data for each partition region based on the pixel-type distribution.

38. The system of claim 37, wherein the pixel-type distribution within each partition region is based on a histogram of the one or more pixel types within each partition region.

39. The system of claim 27, wherein the instructions when executed cause the system to classify the scene of the image by:
  determining a distribution associated with one or more scene variables based on the set of pixel characteristic data of each of the partition regions; and
  determining a classification for the scene based on the distribution associated with the one or more scene variables.

* * * * *